US008061664B2

(12) United States Patent
Ochsner et al.

(10) Patent No.: US 8,061,664 B2

(45) Date of Patent: Nov. 22, 2011

(54) BASE AND SUPPORT SYSTEM FOR A PATIENT SUPPORT APPARATUS

(75) Inventors: Aaron Ochsner, Portland, OR (US); Edward R. Jacobs, Salem, OR (US); Jason Alvarez, Portland, OR (US)

(73) Assignee: A-dec, Inc., Newberg, OR (US)

(*) Notice: Subject to any disclaimer, the term of this patent is extended or adjusted under 35 U.S.C. 154(b) by 240 days.

(21) Appl. No.: 12/371,319

(22) Filed: Feb. 13, 2009

(65) Prior Publication Data

US 2010/0207432 A1 Aug. 19, 2010

(51) Int. Cl.
*F16M 11/00* (2006.01)

(52) U.S. Cl. ..................................... 248/188.8; 248/157

(58) Field of Classification Search ............... 297/344.1, 297/344.12, 344.13, 344.14, 461, 330, 344.16; 248/346.01, 346.06, 121, 122.1, 124.1, 519, 248/80

See application file for complete search history.

(56) References Cited

U.S. PATENT DOCUMENTS

| | | | | | |
|---|---|---|---|---|---|
| 564,044 | A | * | 7/1896 | Berkemeyer | 297/170 |
| D199,978 | S | | 1/1965 | Carnese | |
| 3,578,379 | A | * | 5/1971 | Taylor et al. | 297/71 |
| 3,866,973 | A | * | 2/1975 | Heubeck | 297/316 |
| D237,327 | S | | 10/1975 | Collins et al. | |
| 4,168,099 | A | * | 9/1979 | Jacobs et al. | 297/325 |
| D268,149 | S | | 3/1983 | Case | |
| 4,427,382 | A | * | 1/1984 | Hoffmeister et al. | 433/79 |
| 4,500,134 | A | * | 2/1985 | Kaneko et al. | 297/170 |
| 4,592,590 | A | * | 6/1986 | Slaats et al. | 297/344.19 |
| 4,645,167 | A | * | 2/1987 | Hardwick | 248/520 |
| 4,852,499 | A | * | 8/1989 | Ozols | 108/44 |
| 5,131,717 | A | | 7/1992 | Kaminiski et al. | |
| D333,736 | S | | 3/1993 | Nordstrom | |
| 5,190,349 | A | | 3/1993 | Austin, Jr. et al. | |
| D336,381 | S | | 6/1993 | Nordstrom | |
| 5,267,778 | A | | 12/1993 | Krebs et al. | |
| D347,946 | S | | 6/1994 | Nordstrom et al. | |
| 5,320,415 | A | | 6/1994 | Krebs | |
| 5,340,953 | A | | 8/1994 | Krebs et al. | |
| 5,342,007 | A | | 8/1994 | LaPlante | |
| 5,374,136 | A | | 12/1994 | LaPlante | |
| 5,395,160 | A | | 3/1995 | Krebs et al. | |
| 5,405,115 | A | | 4/1995 | Reed | |
| D357,834 | S | | 5/1995 | Nordstrom et al. | |
| D361,438 | S | | 8/1995 | Spencer et al. | |
| 5,601,331 | A | | 2/1997 | Austin, Jr. et al. | |
| D378,961 | S | | 4/1997 | Nordstrom et al. | |
| 5,628,546 | A | | 5/1997 | Boetzkes | |
| 5,823,699 | A | | 10/1998 | Austin, Jr. et al. | |

(Continued)

OTHER PUBLICATIONS

A-dec, Inc. 500 brochure.

(Continued)

*Primary Examiner* — Amy Sterling
*Assistant Examiner* — Erin W Smith
(74) *Attorney, Agent, or Firm* — Klarquist Sparkman, LLP

(57) ABSTRACT

A base for a patient support apparatus includes a bump member configured to at least partially surround an electrical system of the patient support apparatus. The bump member is configured to be releasably engaged with a cover that is configured to at least partially cover the electrical system of the patient support apparatus. The engagement of the cover and bump member is manually releasable.

7 Claims, 23 Drawing Sheets

U.S. PATENT DOCUMENTS

| | | | | |
|---|---|---|---|---|
| 5,988,754 | A * | 11/1999 | Lamart et al. | 297/423.38 |
| 6,013,882 | A | 1/2000 | Boetzkes | |
| D420,225 | S | 2/2000 | Lamb et al. | |
| 6,382,725 | B1 * | 5/2002 | Carroll | 297/330 |
| 6,516,729 | B1 * | 2/2003 | Dodson et al. | 108/50.11 |
| 6,802,564 | B2 | 10/2004 | Brockway et al. | |
| 6,814,409 | B2 | 11/2004 | Jackson | |
| 6,893,096 | B2 | 5/2005 | Bonn et al. | |
| D525,443 | S | 7/2006 | Takahashi | |
| 7,195,219 | B2 | 3/2007 | Irwin et al. | |
| D542,064 | S | 5/2007 | Hosey | |
| 7,240,966 | B2 | 7/2007 | Stone et al. | |
| 7,290,836 | B2 | 11/2007 | Nordstrom et al. | |
| 7,418,749 | B2 * | 9/2008 | Graham et al. | 5/503.1 |
| D578,787 | S | 10/2008 | Genelli | |
| 7,640,868 | B2 * | 1/2010 | Morrison et al. | 108/91 |
| 2005/0000019 | A1 * | 1/2005 | Newkirk et al. | 5/600 |

OTHER PUBLICATIONS

Sirona Teneo Brochure.

* cited by examiner

BASE AND SUPPORT SYSTEM FOR A PATIENT SUPPORT APPARATUS

FIELD

This application relates to novel patient support apparatuses, and particularly to medical and/or dental chairs that enhance the comfort of the patient and increase the convenience of the operator.

BACKGROUND

Patient support apparatuses, such as dental chairs, generally include mechanisms for raising and lowering the chair and for tilting the back of the chair to adjust the chair from an upright configuration to a reclined configuration. These elements associated with these mechanisms, such as the electrical and other mechanical parts are desirably protected from the elements. It is desirable to provide a system that protects the elements within and which permits sufficient access to the internal parts when necessary.

Patient support apparatuses can also be used to support a variety of structures, including lights, cuspidors, medical tools, etc. Accordingly, it is also desirable to provide improved mechanisms for supporting such external structures.

SUMMARY

Described below are embodiments and implementations of an improved patient support apparatus that increases the comfort of the patient and the convenience of the operator.

In one embodiment, a base for a patient support apparatus comprises a bump member configured to at least partially surround an electrical system of the patient support apparatus. The bump member has a lower portion that forms a lip member and an upper portion that extends upward from the lip member. A cover can be configured to at least partially cover the electrical system of the patient support apparatus. At least a portion of the cover is configured to be received on the lip member so that the cover and bump member are positively engageable with one another, and the engagement of the cover and bump member is manually releasable.

In specific embodiments, the bump member has a stiffness that exceeds that of the cover. In other specific embodiments, the upper portion of the bump member comprises an extension member that extends outwards from the upper portion. The cover can comprise a side portion that has at least one recess at an interior area of the side portion, and the extension member can be configured to extend into the recess of the bump member to releasably secure the cover to the bump ring. In other specific embodiments, at least one recess comprises an opening in the side of the cover and the extension member of the bump member extends through the opening in the cover. In other specific embodiments, the bump member comprises a recessed portion beneath the location of the extension member, and the cover is manually releasable from the bump member by inserting a finger into the recessed portion and pulling the cover outward to disengage the extension member from the cover.

In other specific embodiments, the cover can comprise a first portion that has a first height and a second portion that has a second height. In other specific embodiments, cover can further comprise an opening in the side of the second portion and a post mount can extend outwards from the opening. The post mount can be configured to receive a supporting member. In other specific embodiments, the post mount can comprise a tapered socket with a plurality of openings at least partially surrounding the tapered socket. In other specific embodiments, a post member can be configured to be received in the tapered socket. The post member can be configured to be coupled to the post mount by a plurality of fasteners extending through the openings in the tapered socket. In other specific embodiments, the fasteners can be adjusted to adjust the angle of the post member relative to the floor.

In another embodiment, a dental chair and equipment support apparatus comprises a base member coupled to a lift arm of a dental chair, and a cover configured to at least partially cover the base member. A post mount can be coupled to the base member and can extend outwards from the base member through an opening in the cover. The post mount can be configured to receive a supporting member; and a post member configured to be received in post mount. The post mount can comprise a tapered socket with a plurality of openings at least partially surrounding the tapered socket, and the post member can be configured to be coupled to the post mount by inserting a plurality of fasteners into the openings in the tapered socket.

In specific embodiments, the fasteners can be adjusted to adjust the angle of the post member relative to the floor. In other specific embodiments, a bump member can be configured to at least partially surround an electrical system of the apparatus. The bump member can have a lower portion that forms a lip member and an upper portion that extends upward from the lip member. The upper portion can have an extension member that extends outwards from the upper portion. The cover can have a side portion that has at least one recess at an interior area of the side portion, and at least a portion of the cover can be configured to be received on the lip member. The extension member can be configured to extend into the recess of the bump member to releasably secure the cover to the bump ring. In other specific embodiments, the bump member can comprise a recessed portion beneath the location of the extension member. In other specific embodiments, the cover can be removed from the bump member by inserting a finger into the recessed portion and pulling the cover outward to disengage the extension member from the cover.

In another embodiment, a support apparatus can comprise a tapered socket that defines a post receiving area. A plurality of fasteners can be spaced circumferentially around the tapered socket and can be configured to extend into the post receiving area. A post member can be configured to be received in the post receiving area. The plurality of fasteners can be configured to couple the post member to the tapered socket.

In specific embodiments, the fasteners can be adjusted to adjust the angle of the post member relative to the floor. In other specific embodiments, an orienting member can extend into the post receiving area, and the post member can have a slotted section at a lower end that is configured to mate with the orienting member. In other specific embodiments, a post mount can extend from the tapered socket and be configured for attachment to a patient support apparatus. In yet other specific embodiments, the fasteners can comprise a plurality of set screws that extend into openings in the tapered socket.

In other specific embodiments, various neck support members can be used in combination with the apparatuses and methods discussed above. For example, a patient support apparatus that is pivotable between an upright configuration and a reclined configuration can comprise an upper frame member and a neck support member. The upper frame member can support at least a portion of an upper body of a patient and can have an elongated slot portion. The elongated slot portion can extend substantially vertically when the apparatus is in the upright configuration. The neck support member can have a front side and back side, with the front side of the neck support member being configured to contact at least a portion of the back of the neck of the patient. The neck support member can also have an extension member that extends from the back side of the neck support member, with the extension member being configured to be received in the elongated slot portion. When the extension member is received in the elongated slot portion, the extension member is movable from a first position to a second position within the elongated slot.

In other specific embodiments, various pivoting mechanisms and elements can be used in combination with the apparatuses and methods discussed above. For example, in one embodiment, a pivotable patient support apparatus is provided. The apparatus can comprise an upper frame member, a pivot member coupled to the upper frame member, a pivot base member, and an actuator assembly. The pivot base member can be coupled to the pivot member, and the pivot member can be pivotable relative to the pivot base member about a pivot axis. The actuator assembly can be moveable between a first configuration and a second configuration so that a longitudinal distance between a first end and a second end is different in the two configurations. The first end of the actuator assembly can be coupled to the pivot member at an area off-axis from the pivot axis and the second end of the actuator assembly can be coupled to the pivot base member. In this manner, movement of the actuator assembly from the first configuration to the second configuration will cause the pivot member to pivot about the pivot axis.

In other embodiments, the height of the patient support apparatus can be adjustable in combination with the other apparatuses and methods discussed above. For example, in one embodiment, a fluid control system is provided for use with a patient support apparatus that is moveable from a first height to a second height. The system can comprise a lift arm and a substantially upright cylinder assembly. The lift arm can have a first end and a second end, and the first end of the lift arm can be pivotably coupled to a base member and the second end of the lift arm can be coupled to a chair structure. The substantially upright cylinder assembly can have a base portion and an extendable member configured to contact and support the lift arm. The extendable member can be moveable from a first position to a second position. The base portion of the cylinder assembly can comprise an upper reservoir and a lower reservoir, and a total fluid volume contained in the upper and lower reservoirs can remain substantially the same regardless of the position of the extendable member.

The foregoing and other objects, features, and advantages of the invention will become more apparent from the following detailed description, which proceeds with reference to the accompanying figures.

DETAILED DESCRIPTION

As used in this application and in the claims, the singular forms “a,” “an,” and “the” include the plural forms unless the context clearly dictates otherwise. Additionally, the term "includes" means "comprises." Further, the terms "coupled" and "associated" generally means electrically, electromagnetically, and/or physically (e.g., mechanically or chemically) coupled or linked and does not exclude the presence of intermediate elements between the coupled or associated items.

Moreover, for the sake of simplicity, the attached figures may not show the various ways (readily discernable, based on this disclosure, by one of ordinary skill in the art) in which the disclosed system, method, and apparatus can be used in combination with other systems, methods, and apparatuses. Additionally, the description sometimes uses terms such as "produce" and "provide" to describe the disclosed method. These terms are high-level abstractions of the actual operations that can be performed. The actual operations that correspond to these terms can vary depending on the particular implementation and are, based on this disclosure, readily discernible by one of ordinary skill in the art.

FIGS. 1-6 illustrate various views of an embodiment of a dental chair 10 according to the present disclosure. Dental chair 10 includes a lower body cushion 20 and an upper body cushion 30. The term cushion as used herein refers to any structure that contacts a portion of the patient's body and, in typical applications, provides some amount of padding and/or shock absorption to the dental chair 10.

Figure 1:
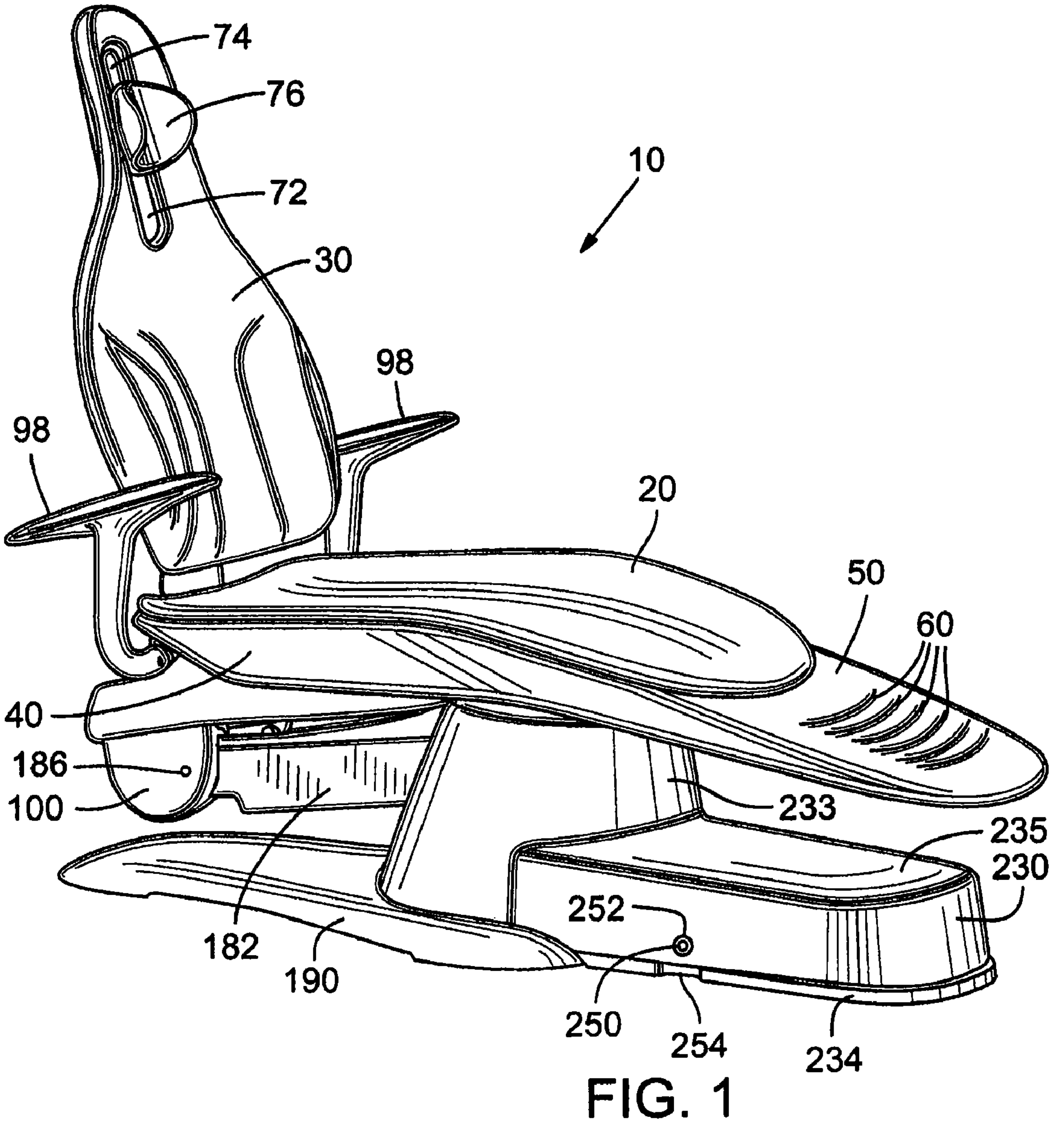
FIG. 1 is a right side perspective view of an embodiment of a patient support apparatus.
Figure 2:
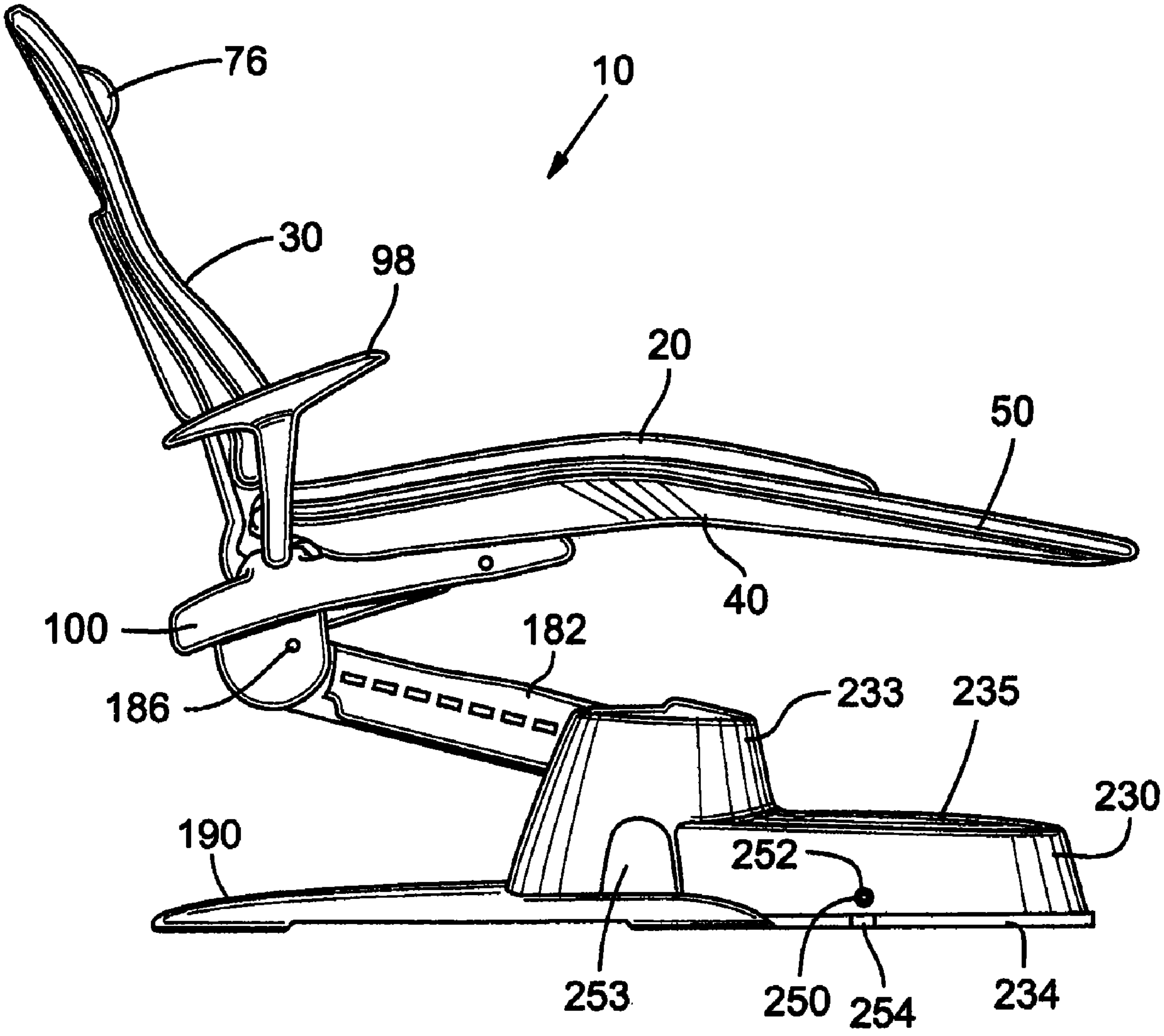
FIG. 2 is a right side view of the patient support apparatus of FIG. 1.
Figure 3:
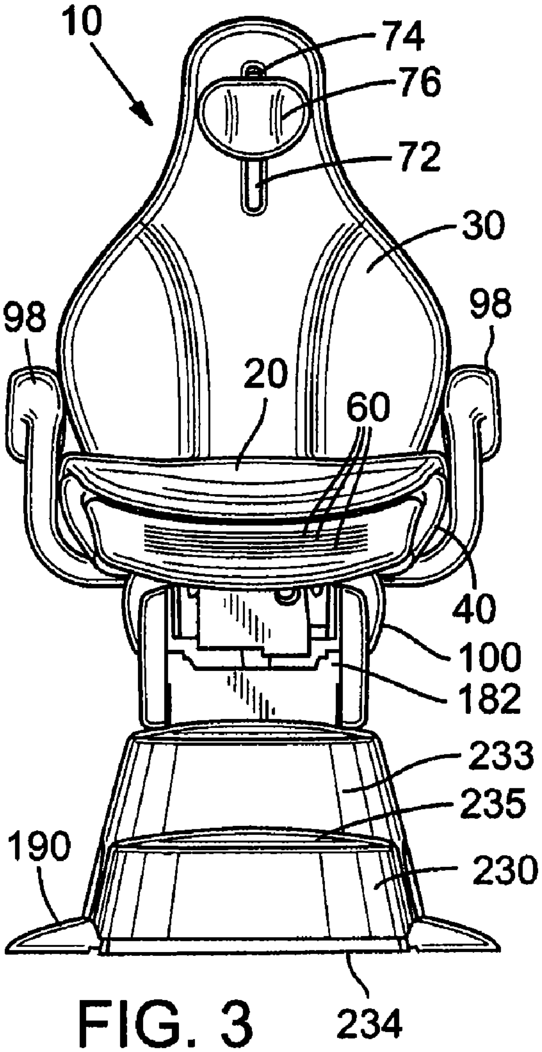
FIG. 3 is a front view of the patient support apparatus of FIG. 1.

Lower body cushion 20 is coupled or attached to a lower body frame 40. As shown in FIG. 1, the lower body cushion 20 desirably does not extend the length of the lower body frame 40. Rather, the lower body cushion 20 desirably extends over only a portion of the length of the lower body frame, thereby leaving an exposed portion 50. The exposed portion 50 (also called the toe-board portion) is preferably located at a foot-receiving end, as shown in FIG. 1. As illustrated, exposed portion 50 is not covered by lower body cushion 20. Exposed portion 50 can be formed with optional grooves 60, which provide a gripping surface for a patient to use to push off of or grip with their feet while entering and/or exiting the dental chair 10. Instead of grooves, the exposed portion 50 can be formed with other surface irregularities and/or discontinuities, such as various indentations and/or raised areas, which increase the exposed portion's 50 ability to contact and grip the feet (or shoes) of the patient. The toe-board area is preferably formed with a texture(s) and a color(s) that minimizes the appearance of discolorations, scuffs, and other marring that can result during patient entry into and exit from the chair. For example, the toe-board can be formed with a gray color and with specks and molded ridges in the material that help hide such discoloration, scratches, and other marring.

At least the exposed portion 50 of the lower body frame 40 is desirably formed from a sturdy, scuff-resistant material, such as, for example, high-density polyethylene (HDPE). By forming the exposed portion out of a sturdy, scuff-resistant plastic, it is possible to leave the toe-board portion of the lower body frame exposed (e.g., not covered with an upholstered cushion or other covering material). Since a portion of the lower body frame 40 is left exposed, the length of the lower body cushion 20 is reduced, which in turn reduces the amount of materials required for the production of the dental chair 10. In addition, by leaving the exposed portion 50 uncovered, there is less material contacting the lower body (legs and feet) of a patient, which allows patients to more easily slide their legs laterally across the dental chair when entering or exiting the dental chair.

Desirably, the entire lower body frame 40 (lower frame member) is formed from a single material, such as HDPE. By using a single material, construction of the lower body frame 40 can be simplified and its structural integrity improved. Of course, multiple materials can be used if suited to the particular application.

Figure 4:
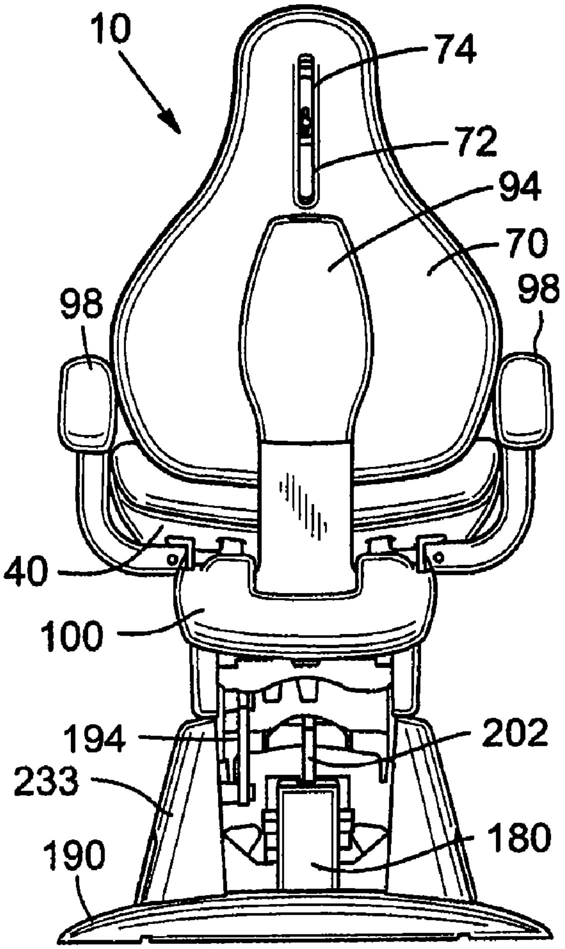
FIG. 4 is a rear view of the patient support apparatus of FIG. 1.
Figure 5:
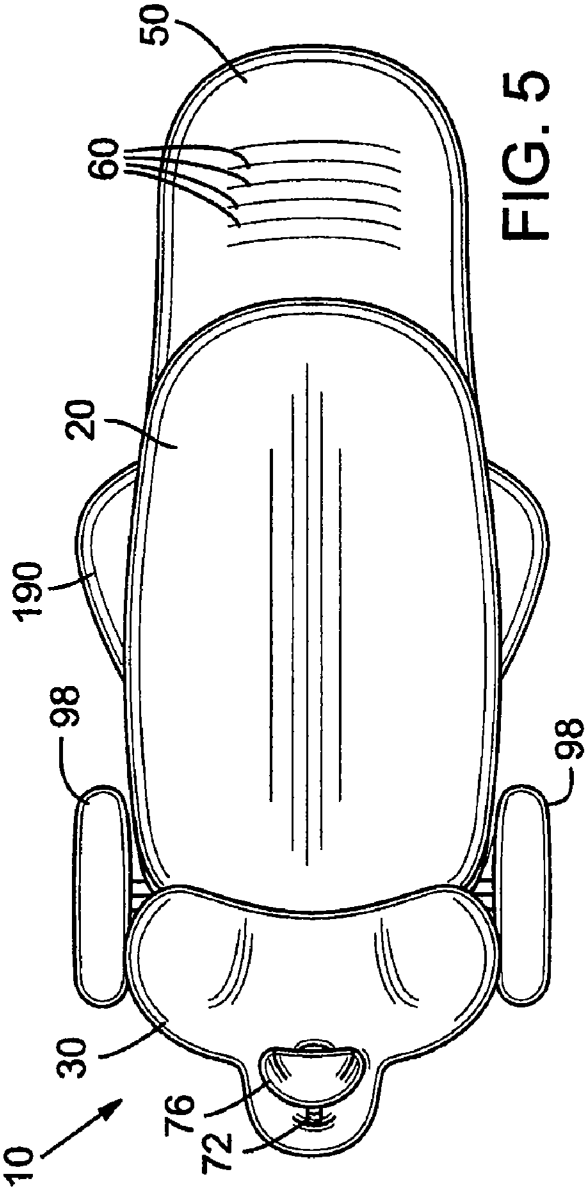
FIG. 5 is a top view of the patient support apparatus of FIG. 1.
Figure 6:
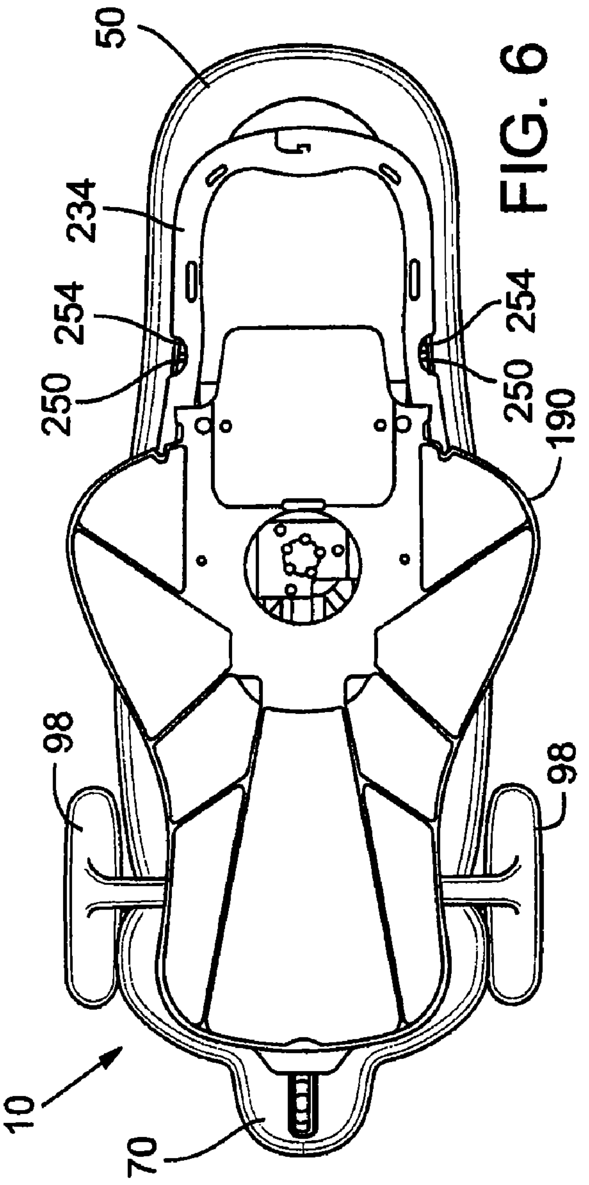
FIG. 6 is a bottom view of the patient support apparatus of FIG. 1.

Upper body cushion 30 is coupled or attached to an upper body frame 70 (upper frame member), as best shown in FIG. 4. Upper body frame 70 can have a shape that is substantially the same as the shape of the upper body cushion 30, as shown in FIGS. 1-6. That is, the cushion does not project beyond the frame, and the frame is only minimally exposed on the patient side by a narrow margin between the outermost extents of the upper body cushion 30 and the upper body frame 70. Alternatively, upper body frame 70 can have a shape that is different from the shape of the upper body cushion 30.

Figure 7:
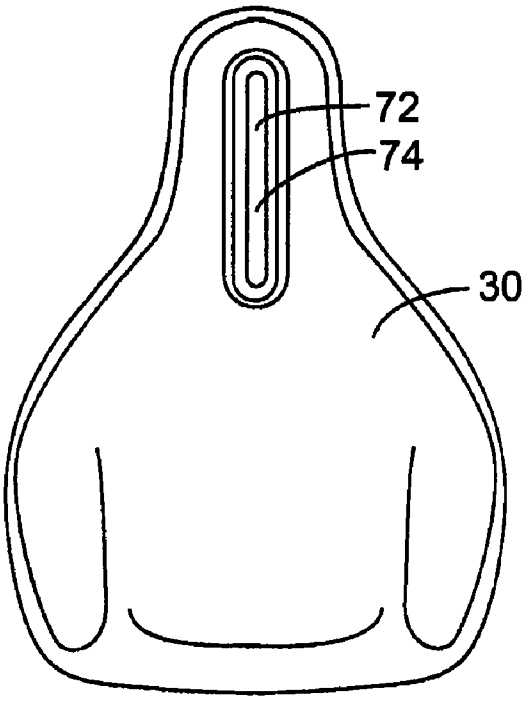
FIG. 7 is a front view of an upper portion, including an upper frame member, of a patient support apparatus.
Figure 9:
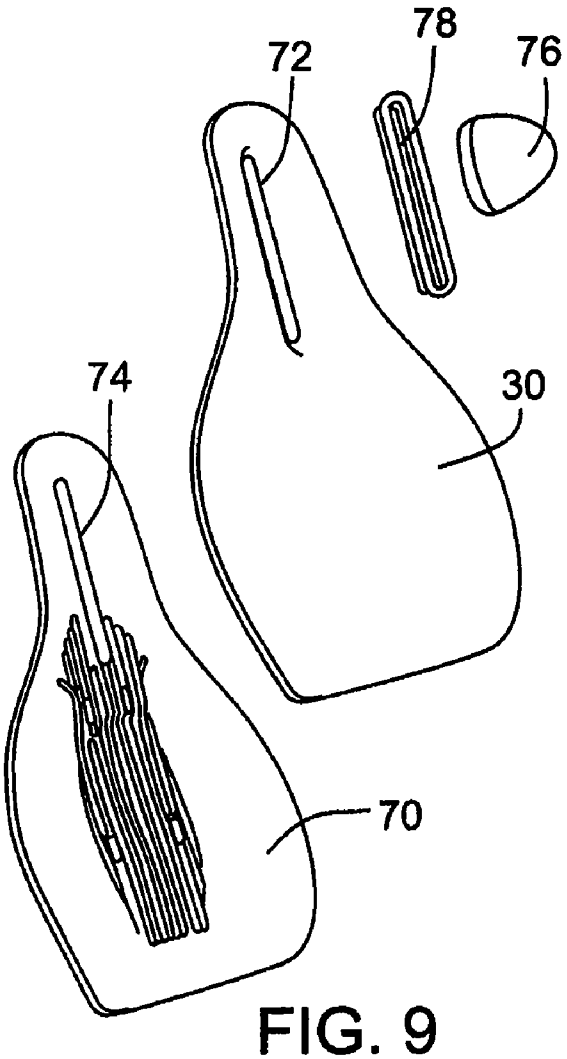
FIG. 9 is an exploded view of the apparatus shown in FIG. 7.
Figure 8:
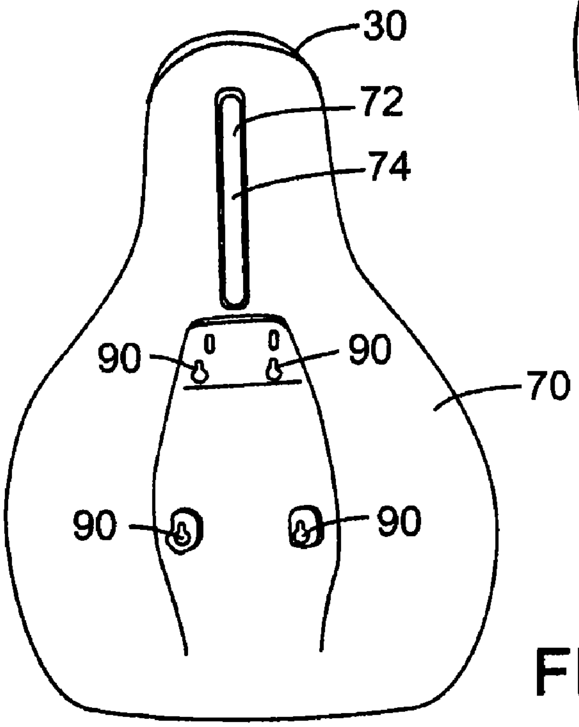
FIG. 8 is a back view of the apparatus shown in FIG. 7.
Figure 11:
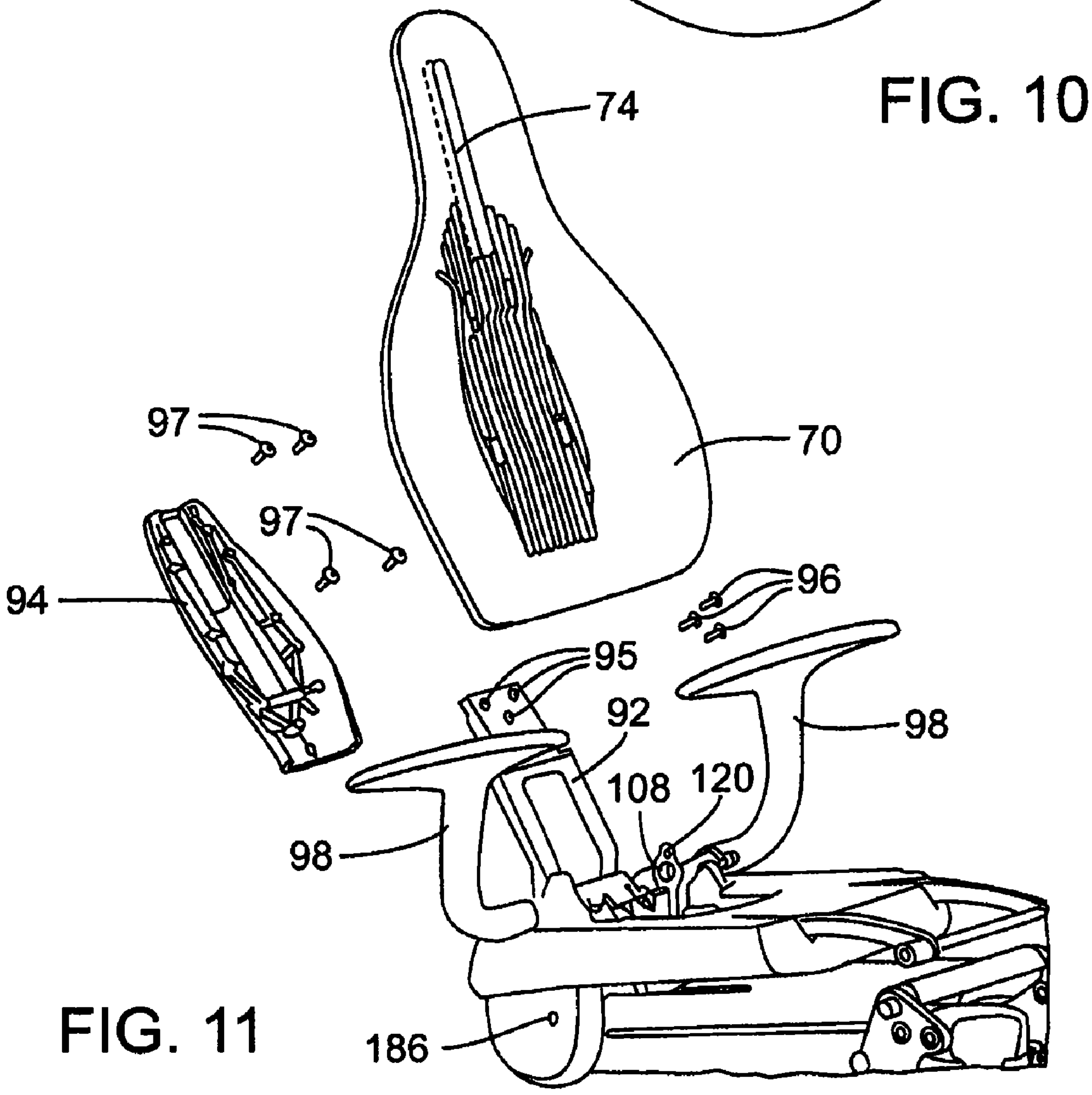
FIG. 11 is a perspective exploded view of a portion of a patient support apparatus.

Referring to FIGS. 7, 8, and 9, upper body cushion 30 and upper body frame 70 are shown in more detail. Both upper body cushion 30 and upper body frame 70 can be formed with openings, such as elongate openings 72, 74 (or slots), respectively, which are configured to receive a neck support member 76. As shown in FIG. 8, upper body frame 70 can have slotted members 90 on its rear facing side. These slotted members 90 can be used to couple the upper body frame 70 to a pivot member 92 (described in more detail below) via a back support member 94, as shown in FIG. 11. Upper body cushion 30 desirably comprises a single continuous (unitary) cushion substantially extending from a bottom portion to a top portion of the upper body frame 70. A part of the continuous cushion that covers the bottom portion of the upper frame member is configured to contact at least a portion of a lower back of the patient and a part of the continuous cushion that covers the top portion of the upper frame member is configured to contact at least a portion of the back of the head of the patient.

Figure 27:
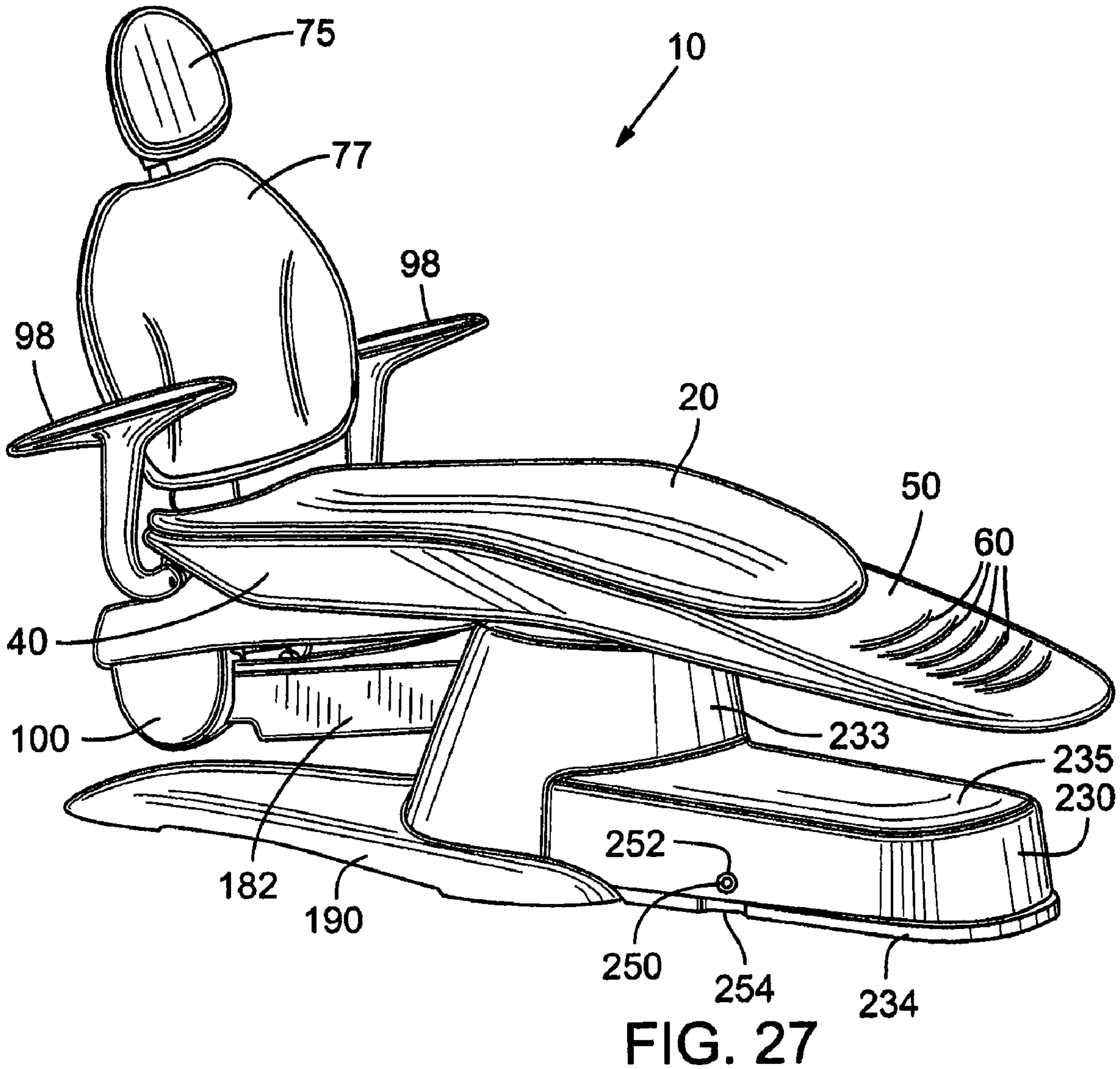
FIG. 27 is a right side perspective view of an embodiment of a patient support apparatus with a two-piece back.

Other cushion and chair back arrangements are also possible. As one example, as shown in FIG. 27, the upper body frame can be formed with separate top portion 75 and bottom portion 77 that are connected together. In such a case, two separate cushions can cover the top and bottom portions 75, 77 of the upper body frame.

Referring to FIG. 9, upper body cushion 30 can be coupled to upper body frame 70, so that openings 72, 74 are in substantial alignment within one another. A slot member 78 can be positioned into openings 72, 74 after the upper body cushion 30 is coupled to the upper body frame 70. Slot member 78 can further define an opening into which neck support member 76 is received. The slot member can be positioned in an intermediate area between the bottom portion of the cushion (which contacts a portions of the patient's back) and the top portion of the cushion (which contacts a portion of the back of the patient's head). Thus, with a neck support member 76 received in the slot member, the neck support member can contact the back of the neck of a patient. Slot member 78 can also be configured so that neck support member 76 is capable of sliding within slot member 78 when a portion of neck support member 76 is received in the slot member 78.

Figure 10:
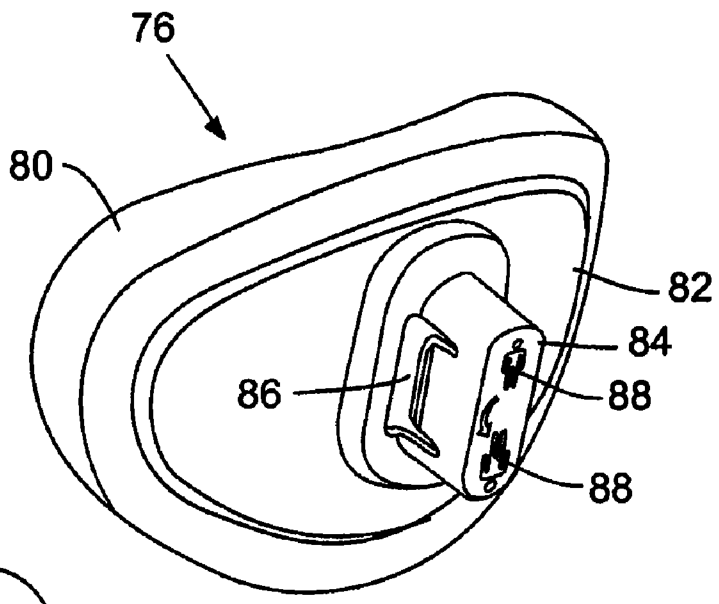
FIG. 10 is a perspective view of a neck support member of a patient support apparatus.

FIG. 10 is a back perspective view of neck support member 76. As shown in FIG. 10, neck support member 76 includes a neck cushion 80 and a neck support frame 82. Neck support frame 82 can comprise an extension member 84 that extends from the neck support frame 82. Extension member 84 can be configured to be received into slot member 78. If desired, extension member 84 can be configured with securing members 86 (one on each side of the extension member 84), which releasably secure the neck support member 76 in the slot member 78, preventing it from falling out of the slot member 78. Securing members 86 can be configured to snap into place along a rail of the slot member 78, temporarily securing the neck support member 76 in the slot member 78. Alternatively, instead of forming a snap fit, securing members 86 can simply provide a friction fit. Other mechanisms for retaining or helping to retain the neck support member 76 within the slot member 78 can be provided, such as the provision of a magnetic element on one or both of the neck support member 76 and the slot member 78.

Whether the neck support member 76 is secured in the slot member 78 by a snap fit, friction fit, or other coupling mechanism, the neck support member 76 is desirably configured to be held within the slot member 78 in such a manner that it can translate in or move longitudinally within the slot member 78. The length of the slot member 78 can vary, depending on the amount of travel desired for the neck support member 76. Desirably, the longitudinal amount of travel within the slot member 78 is about 5 to 15 inches, and more desirably about 9 inches. In addition, to obtain an additional effective amount of travel, the neck support member 76 can be configured to be reversible. As shown in FIG. 10, extension member 84 is offset from a central position of the neck support frame 82. In particular, the extension member 84 can be offset so that the length of travel of the neck support member 76 can be increased.

For example, in the configuration shown in FIG. 10, the neck support member 76 can be positioned at a lower position relative to the upper body cushion 30 and, thus, a smaller (e.g., shorter) person can be accommodated on the dental chair 10. Alternatively, to accommodate a larger (e.g., taller) person, the neck support member 76 can be reversed 180 degrees (i.e., "flipped upside down") to a second orientation, so that the neck cushion 80 can reach a higher height relative to the upper body cushion 30. For convenience, indicia 88 can be placed on the neck support member 76 to indicate whether the neck support member is in the configuration for larger or smaller persons. By offsetting the extension member 84 in the manner described above, an additional effective amount of travel of the neck cushion 80 can be achieved. The amount of additional travel can vary depending on the configuration of the neck support member 76, but the minimum amount of travel is preferably at least about one inch. The amount of travel can exceed one inch and can be between about 1 and 4 inches. For example, in one embodiment, the effective position of the neck cushion 80 can reach a height of about one inch lower when it is configured for smaller persons (such as in the configuration shown in FIG. 10) and about one inch higher when it is configured for larger persons (such as when the configuration shown in FIG. 10 is reversed).

Neck cushion 80 is desirably symmetrical about an axis. Thus, the neck cushion 80 is desirably substantially symmetrical whether oriented in the configuration shown in FIG. 10 or in a configuration opposite to that shown in FIG. 10. However, if desired, the neck cushion 80 can be configured to be non-symmetrical so that it could have one comfort orientation in a first configuration and a second comfort orientation in a second, reversed configuration.

The neck support receiving area (for receiving the neck support member 76) can be an opening that extends longitudinally along the upper frame member. In the illustrated embodiment, the opening is an elongated slot. However, it should be understood, that the neck support receiving area can comprise other longitudinal openings, such as, for example, grooves or channels, which may or may not pass entirely through the upper frame member and/or upper body cushion.

In operation the neck support member can be self adjusting. When a patient is positioned in the chair so that a lower portion of the upper frame member contacts at least a portion of the patient's back, the neck support member will remain positioned against the back of the patient's neck while the chair moves from an upright configuration to a reclined configuration, and vice versa. For example, as the upper body frame 70 reclines, the neck support member can translate in or move downward within the slot member to automatically accommodate the location of the patient's neck relative to the upper body frame 70. Thus, the self adjusting neck support member can maintain contact with the patient (e.g., the back of the patient's neck), thereby increasing the patient's comfort as the chair is repositioned without requiring separate adjustment by the operator.

FIG. 11 illustrates an embodiment for coupling the upper body frame 70 to a lower portion of the dental chair, such as a pivot member 92. Upper body frame 70 can be coupled to back support member 94 which in turn can be coupled to pivot member 92, for example, by screws 96. Upper body frame 70 can be removably attached to back support member using bolts 97 that are sized to mate with slotted members 90 (see FIG. 8).

Figure 12:
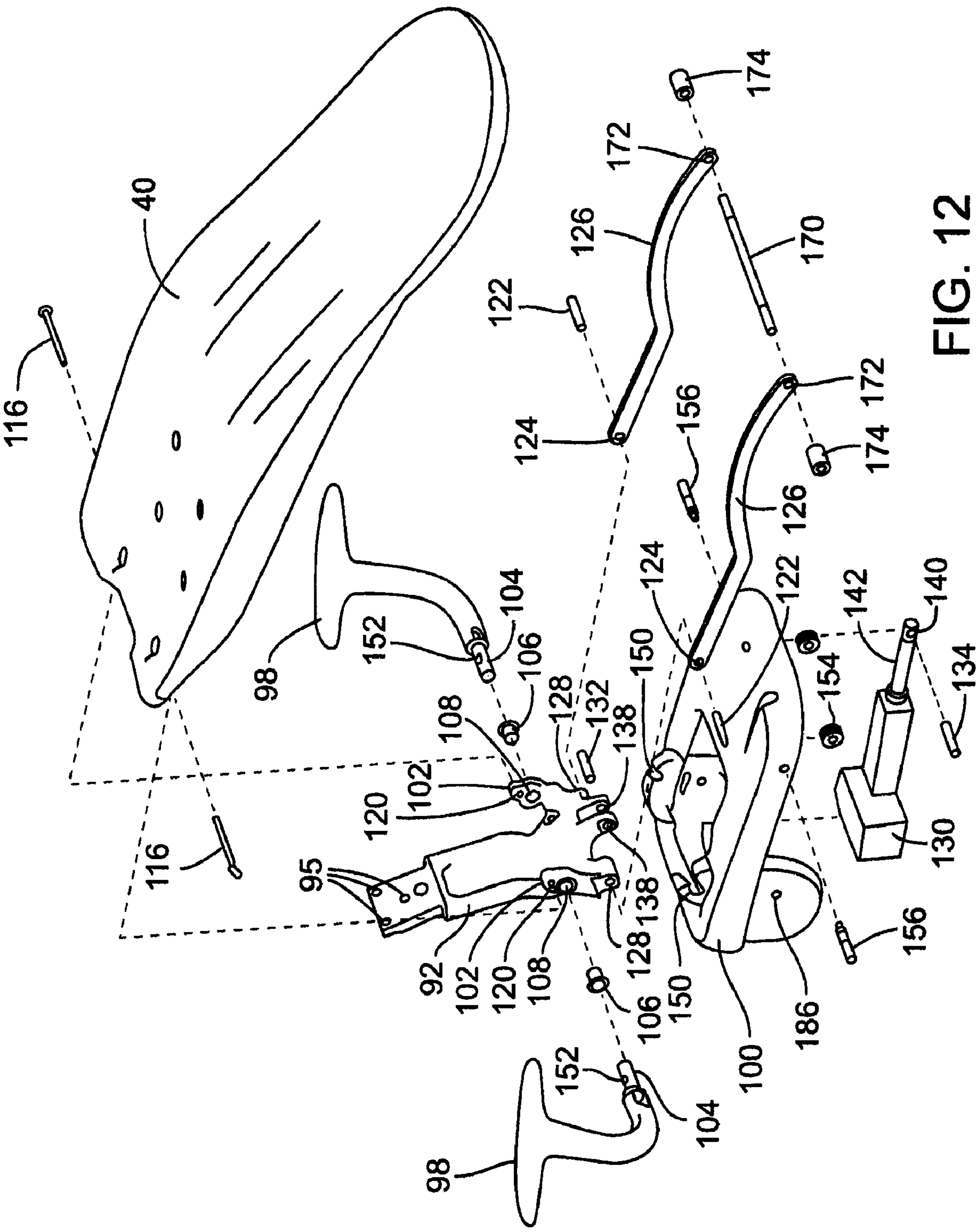
FIG. 12 is a top perspective exploded view of another portion of a patient support apparatus.
Figure 13:
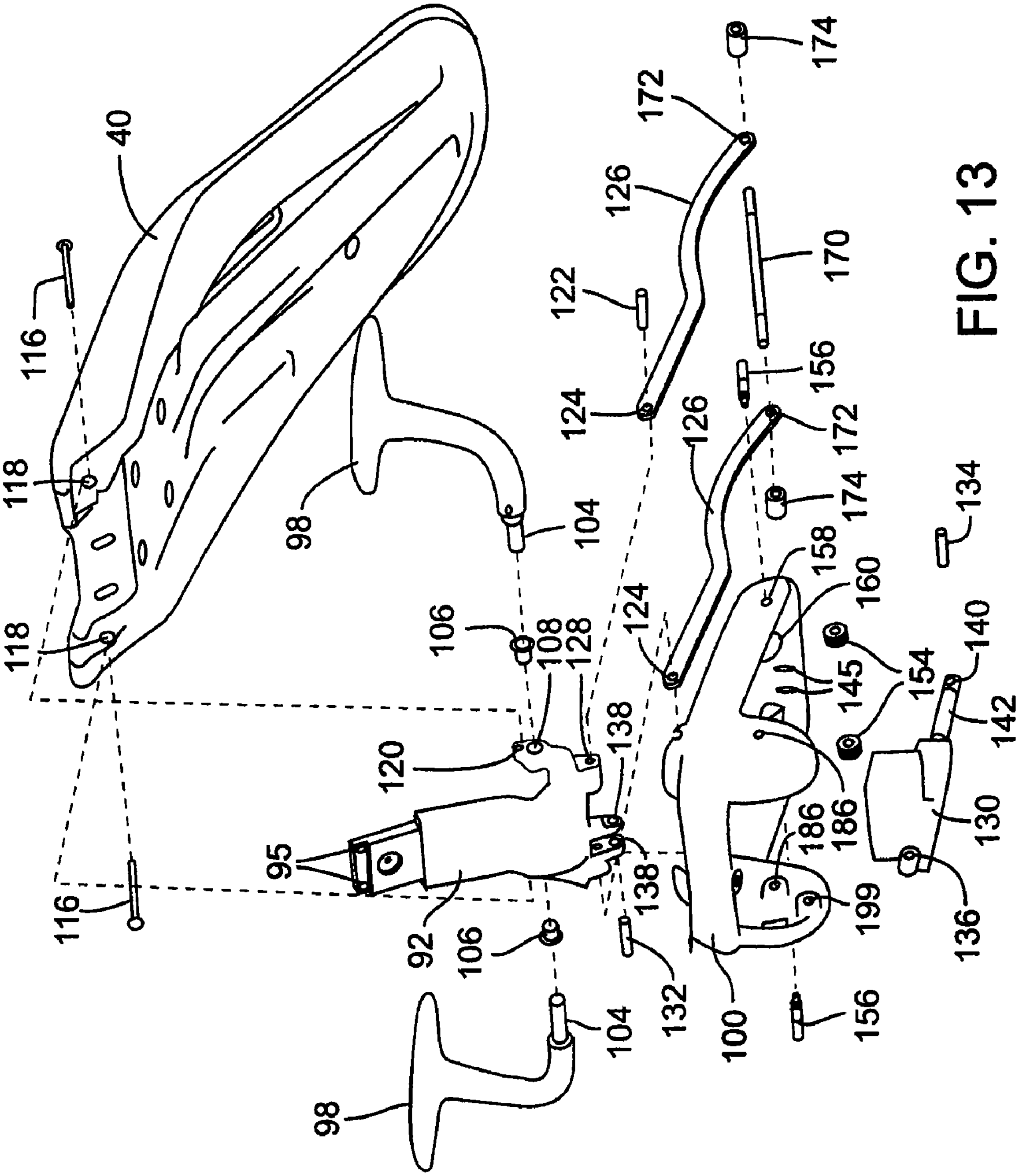
FIG. 13 is a bottom perspective exploded view of another portion of a patient support apparatus.

FIGS. 12 and 13 illustrate a method for coupling pivot member 92 to armrests 98 and to an upper structure member 100 (or pivot base member). Pivot member 92 can comprise a substantially planar portion that has an upper portion and a lower portion. The lower portion can comprise an actuator assembly connection area (e.g., openings 138 as discussed below). A portion can extend outward from the lower portion (e.g., extension portion 102) and include a pivot point connection area (e.g., openings 108 as discussed below) and a lower frame connection area (e.g., openings 120 as discussed below). The distance from the lower portion of the pivot member 92 to the lower frame connection area is greater than the distance from the pivot point connection area to the lower portion of the pivot member 92.

Armrests 98 can be attached to pivot member extension portions 102 via pins 104 that extend from the armrests 98 and are passed through collars 106 and into an opening 108 in the pivot member extension portion 102. Collars 106 are preferably configured so that pins 104 can rotate easily within collars 106. Pins 104 are configured to rest in grooves or receiving areas 150. Receiving areas 150 can be formed in a "v"- or "u"-shaped configuration and pins 104 can be configured to rest in the "v"- or "u"-shaped configuration. Accordingly, the pivot member 92 can pivot about the pivot axis created by pins 104 and the receiving areas 150. Pins 104 can be secured within the receiving area by securing a screw or other securing mechanism (not shown) through an opening 152 in pins 104 and through a corresponding opening (not shown) in the receiving areas 150.

Figure 19:
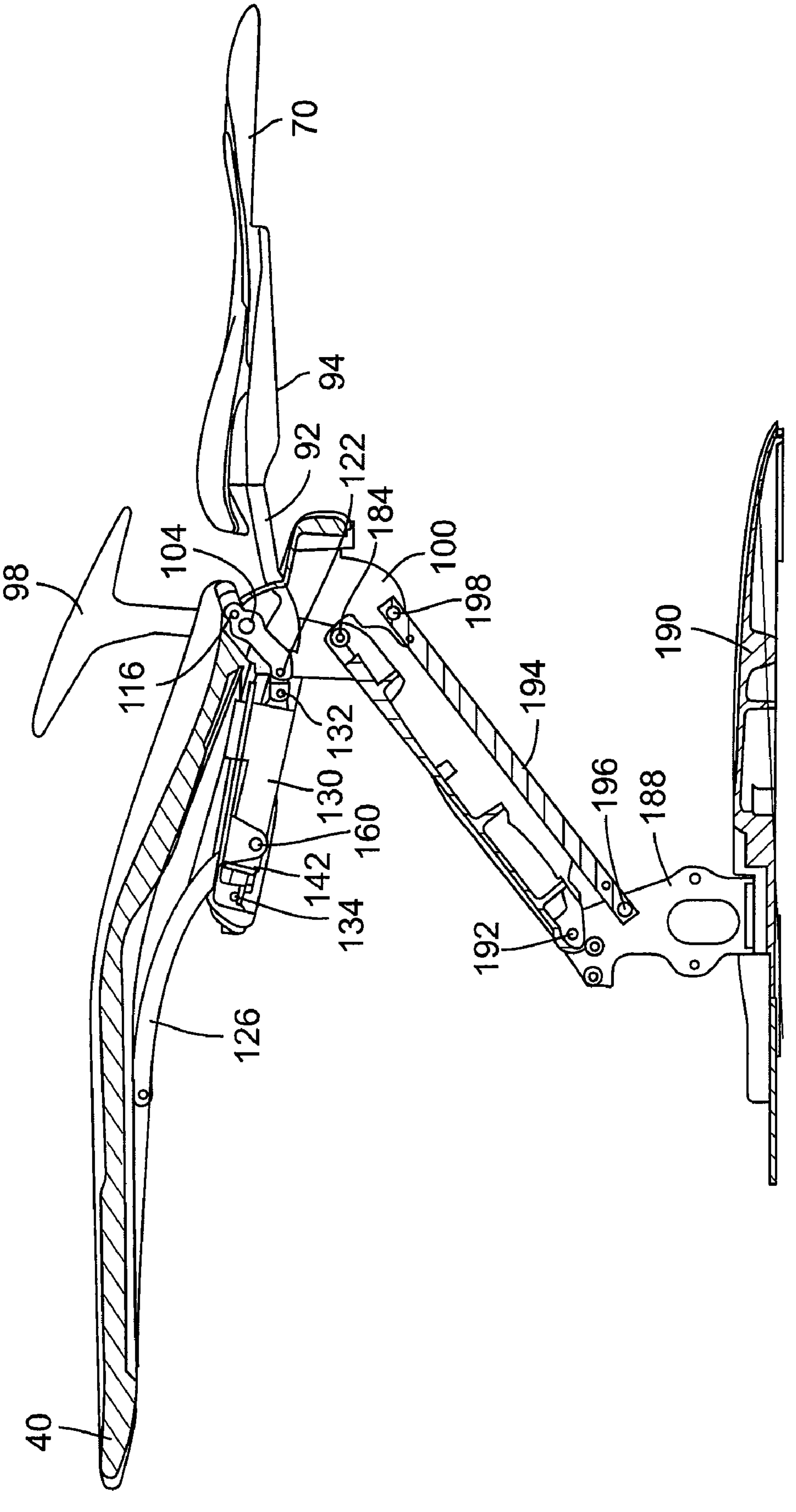
FIG. 19 is a left side, partial sectional view of a portion of a patient support apparatus, shown with an upper frame member in a reclined configuration.

As shown in an illustrated embodiment, armrests 98 can be configured so that only a portion of the armrests 98 is available to the patient when the chair is in a generally upright configuration (see, e.g., FIG. 2), but the entirety of the armrests 98 are available to the patient when the chair is in a more reclined configuration (see, e.g., FIG. 19). That is, referring to FIG. 2, for example, in an upright configuration a portion of the armrest 98 can extend behind the position of the chair back (e.g., cushion 30) and that portion would therefore not be generally available for a patient to utilize (e.g., lean on, etc.). However, as the chair pivots to a reclined position, the patient would be able to easily access the full length of the armrests as shown in FIG. 19. Accordingly, the armrests 98 can be configured to be partially positioned behind the chair back when the chair is in the upright configuration. By configuring the armrests 98 in this manner, the armrest on the side configured for patient entry into the chair will not interfere with the patient's ability to get in and out of the chair. However, when the chair is fully reclined, the patient will still have full use of the armrests 98.

Figure 14:
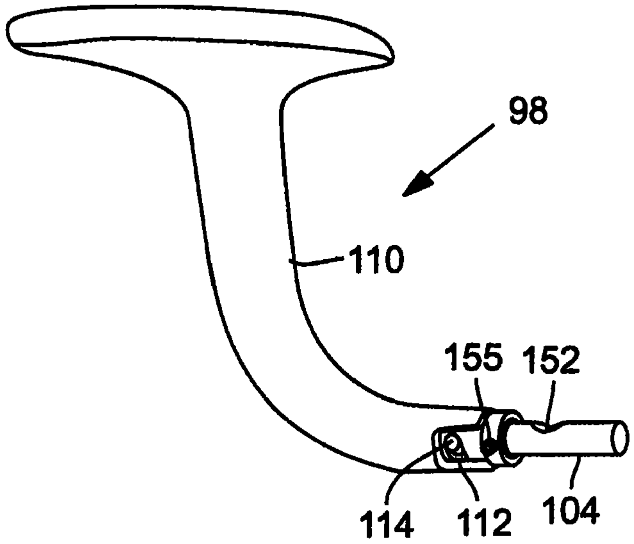
FIG. 14 is a perspective view of an armrest of a patient support apparatus.
Figure 15:
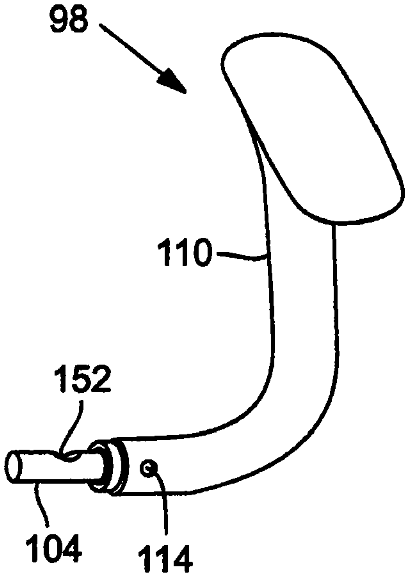
FIG. 15 is another perspective view of an armrest of a patient support apparatus.

Armrests 98 can also be configured to be pivotable either with pivot member 92 or independently of pivot member 92. Referring to FIGS. 14 and 15, armrests 98 can be configured to pivot or tilt after being coupled to pivot member 92. For example, as shown in FIG. 14, a main portion 110 of the armrest 98 can be movable relative to the pin 104. In one embodiment, the main portion 110 can have a slotted section 112 and a screw 114 can pass through the slotted section 112 and into a portion of pin 104. In this manner, the main portion 110 of the armrest 98 can rotate or pivot within the slotted section 112. Preferably, the armrests 98 can pivot between about 45 and 135 degrees, and more preferably between about 75 and 105 degrees. If desired, a friction adjustment member 155 can be provided to adjust the ease with which the armrests 98 are able to pivot. By tightening or loosening friction adjustment member 155, the armrest 98 can be configured to pivot less easily or more easily, respectively. The friction adjustment member 155 can comprise, for example, a screw that can tighten against a split bushing, causing a force to be exerted on the pin 104.

Alternatively, as shown in FIG. 15, armrests 98 can be configured so that they are fixed and do not pivot when pivot member 92 pivots. For example, screw 114 can be positioned in a non-slotted section to hold the main portion 110 of the armrest 98 in a fixed position relative to pin 104. If desired, each armrest 98 can be configured with one side having a slotted section (FIG. 14) and one side having a non-slotted section (FIG. 15). Thus, each armrest 98 can be configured to be both pivotable and non-pivotable, depending on whether the screw 114 is used on one side or the other. A single armrest that is able to be configured into two different operational modes is beneficial because it permits the operator to select and/or adjust the configuration of the armrests based on preference and/or a particular procedure that is to be performed.

Referring again to FIGS. 12 and 13, the lower body frame 40 can be attached to the pivot member 92 at the pivot member extension portions 102. In particular, lower body frame 40 can be connected by securing pins 116 (or other securing members) through openings 118 in the lower body frame 40 and through openings 120 in the pivot member 92.

Pivot member 92 can also be pivotably coupled to cams 126 (or supporting members). A first end of each cam 126 preferably has an opening 124 that can be coupled to a portion of the back pivot 92. For example, each opening 124 can be configured to receive a pin 122. Pin 122 can also pass through an opening 128 in the pivot member 92 to pivotably couple each cam 126 to the pivot member 92. A lower portion of the lower body frame 40 is supported by the cams 126. Each cam 126 can be configured with a substantially straight section and a curved or non-straight section. By creating a portion of each cam with a curved or non-straight section, the lower body frame 40 can change the angle it forms relative to the ground as the pivot member 92 moves, as discussed in more detail below.

As pivot member 92 rotates or pivots, lower body frame 40 also moves and the relationship of the lower body frame 40 relative to the ground will vary depending on the shape of the cams 126 and the point of contact between the lower body frame 40 and the cams 126. The two cams 126 are preferably coupled together with a trolley pin or bar 170 for structural stability and to further support lower body frame 40. Bar 170 can be coupled to both cams 126 by passing bar 170 through openings 172 in the curved end of cams 126. Bar 170 can also be coupled to rollers 174, which can also be configured to support the lower body frame 40. Rollers 174 can help keep bar 170 centered between cams 126. If desired, the lower side of the lower body frame 40 can be constructed with recesses, grooves, and/or tracks to receive the rollers 174 and/or bar 170.

A portion of the cams 126 is preferably positioned to rest on rollers 154, which are coupled to the upper structure 100. As best seen in FIG. 13, rollers 154 can be secured to the upper structure 100 by passing pins 156 through the rollers 154, and then through an opening 158 in the side of the upper structure 100 and another opening 160 that extends from a lower surface of the upper structure 100. Rollers 154 roll or rotate to permit the cams 126 to move easily along the upper structure 100 when the pivot member 92 moves or pivots (as discussed in more detail below).

An actuator assembly 130 can be configured to cause the pivot member 92 to pivot or rotate. Actuator assembly 130 can comprise a first end and a second end and be moveable between a first configuration and a second configuration. As the actuator assembly 130 moves between the two configurations, the length of the actuator assembly, defined by the longitudinal distance between the first and second ends, can change, causing the pivot member to pivot. Actuator assembly 130 is preferably coupled to both the pivot member 92 and the upper structure 100. As shown in FIGS. 12 and 13, a pin 132 can be configured to secure a first end of the actuator assembly 130 (e.g., a base portion) to the pivot member 92 and another pin 134 can be configured to secure a second end (e.g., an extendable portion) of the actuator assembly 130 to the upper structure 100. Pin 132 can be configured to pass through an opening 136 at the first end of the actuator assembly 130 (as shown in FIG. 13) and through a pair of openings 138 in the pivot member 92. Pin 134 can be configured to pass through an opening 140 at the second end of the actuator assembly 130. Opening 140 is preferably formed in a rod or piston portion 142 of the actuator assembly 130. Thus, as discussed above, the first end of the actuator assembly 130 preferably comprises a base portion and the second end preferably comprises an extendable portion (such as a rod or piston). The actuator assembly 130 can be, in a preferred embodiment, a linear actuator that is capable of extending (travelling) between about 50 and 150 mm between a non-extended position and an extended position, and more preferably between about 100 mm and 120 mm.

Figure 16:
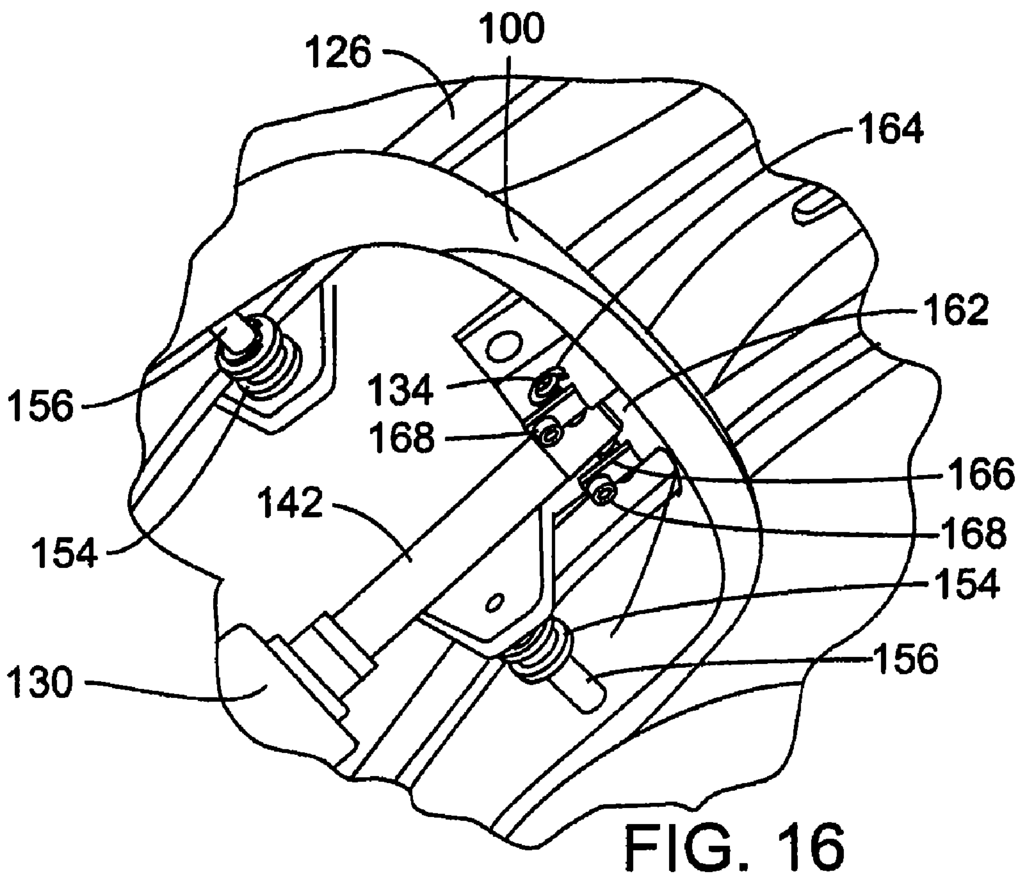
FIG. 16 is a partial view of a portion of a patient support apparatus showing an actuator assembly.

Referring to FIG. 16, one embodiment of attaching the second end of the actuator assembly 130 to the upper structure 100 is shown. Rod 142 is positioned into a recess 162 in a portion of the upper structure. Pin 134 passes through the opening 140 in rod 142 of the actuator assembly 130 and through two openings in sides of the recess 162. An e-clip 164 or other securing means attaches or secures pin 134 to the upper structure 100. One or more retaining tabs 166 can be positioned beneath the rod 142 and screwed to the upper structure 100 with screws 168 to further secure the rod 142 to the upper structure 100.

The pivot motion of a chair, such as a dental chair or other chair designed to move from a first upright position to a second reclining position, preferably pivots in such a manner to mimic the pivot position of a person's hips. By configuring the chair with a single mechanism (e.g., the actuator assembly) that both raises or reclines (e.g., tilts) the chair back and, at the same time, moves the chair seat forward and backward, a simplified and effective method of following the natural pivot position of a person's hips can be achieved.

Figure 17:
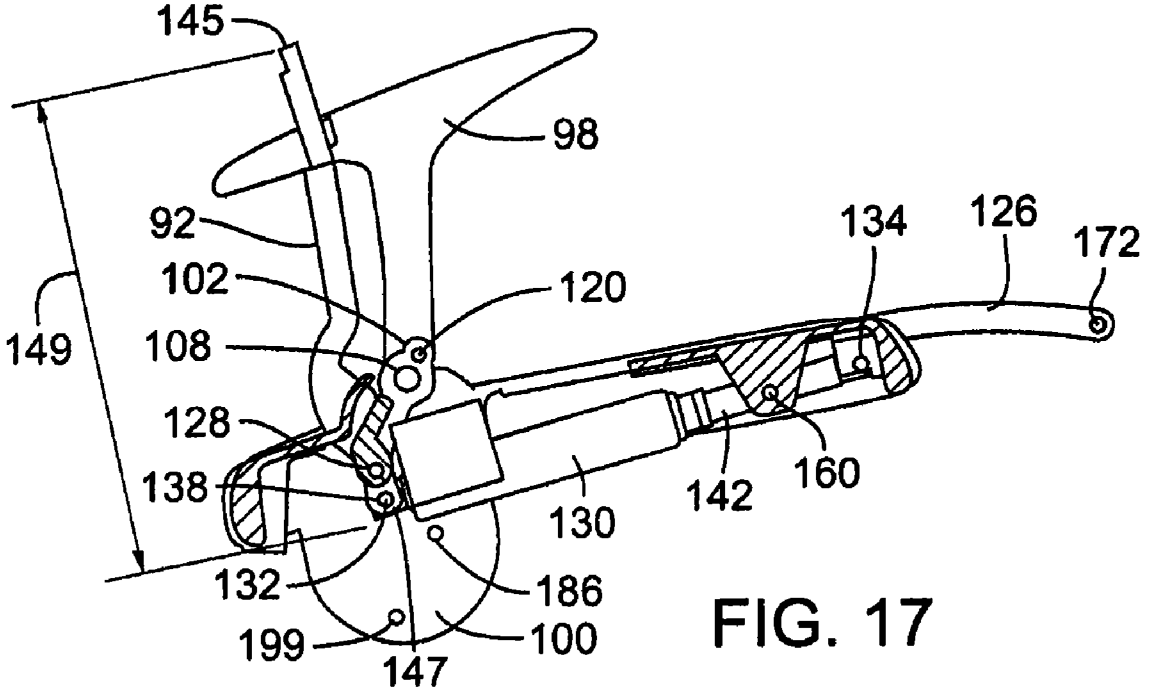
FIG. 17 is a partial sectional view of a portion of a patient support apparatus, showing an actuator assembly.

FIG. 17 illustrates the pivot points of a chair 10 constructed as described above. The pivot member 92 is shown in the upright position (see also FIG. 18), with the actuator assembly 130 in the extended position. That is, rod 142 is in the fully-extended (or substantially fully-extended) position, which results in the pivot member 92 and upper body frame 70 being in an upright or substantially upright position. When pin 104 of the armrests 98 is received into receiving areas 150 (as shown in FIG. 12), the pivot member 92 pivots about the axis defined by the pin 104 that is received in opening 108.

As illustrated above, multiple elements are connected to pivot member 92 at points that are offset from the pivot member's pivot point about pin 104. Referring again to FIG. 17, pin 116 passes through opening 120 to attach the lower body frame 40 to the pivot member 92. Accordingly, the lower body frame 40 is offset from the pivot point about pin 104 and movement of the pivot member 92 about pin 104 causes off-axis (or eccentric) movement of the lower body frame 40.

The point of attachment of the actuator assembly 130 is also offset from the pivot point of the pivot member 92 about pin 104. As shown in FIG. 13, pin 132 passes through an opening 136 at the first end of the actuator assembly 130 and through a pair of openings 138 in the pivot member 92. Referring again to FIG. 17, it can be seen that the pin 132 that couples actuator assembly 130 is offset from the pivot point of the pivot member 92 about pin 104.

The points of attachment of the cams 126 to the pivot member 92 are also desirably offset from the location of the pivot point of the pivot member 92 about pin 104. As shown in FIG. 17, cams 126 are coupled to pivot member by securing pin 122 into opening 128.

As shown in FIGS. 12 and 13, a pin 132 can be configured to secure a first end of the actuator assembly 130 to the pivot member 92 and another pin 134 can be configured to secure a second end of the actuator assembly 130 to the upper structure 100. Pin 132 can be configured to pass through an opening 136 at the first end of the actuator assembly 130 (as shown in FIG. 13) and through a pair of openings 138 in the pivot member 92. Pin 134 can be configured to pass through an opening 140 at the second end of the actuator assembly 130. Opening 140 is preferably formed in a rod or piston portion 142 of the actuator assembly 130.

As shown in FIG. 17, pivot member 92 can also be described relative to its pivot axis and the location of the areas for connecting other elements relative to the pivot axis. That is pivot member 92 has a first end 145 and a second end 147, with a longitudinal length 149 between these two ends. A first frame connection area (e.g., for receiving upper frame member 70) can be located near the first end 145, and an actuator assembly connection area (e.g., for receiving an actuator assembly 130) can be located near the second end 147.

As described above, pivot member 92 can be pivotable about a pivot axis attachment area (opening 108) located between the first end 145 and the second end 147. The pivot axis can also be located off-axis, between the first and second ends. For example, pivot member 92 has an extension (extending) portion 102 that extends outwards from between the pivot member 92 between the first and second ends 145, 147. The extension portion 102 also has a frame connection area (e.g. opening 120) for receiving the lower frame member 40. This frame connection area (opening 120) is located at an area that extends beyond the pivot point connection area.

Figure 18:
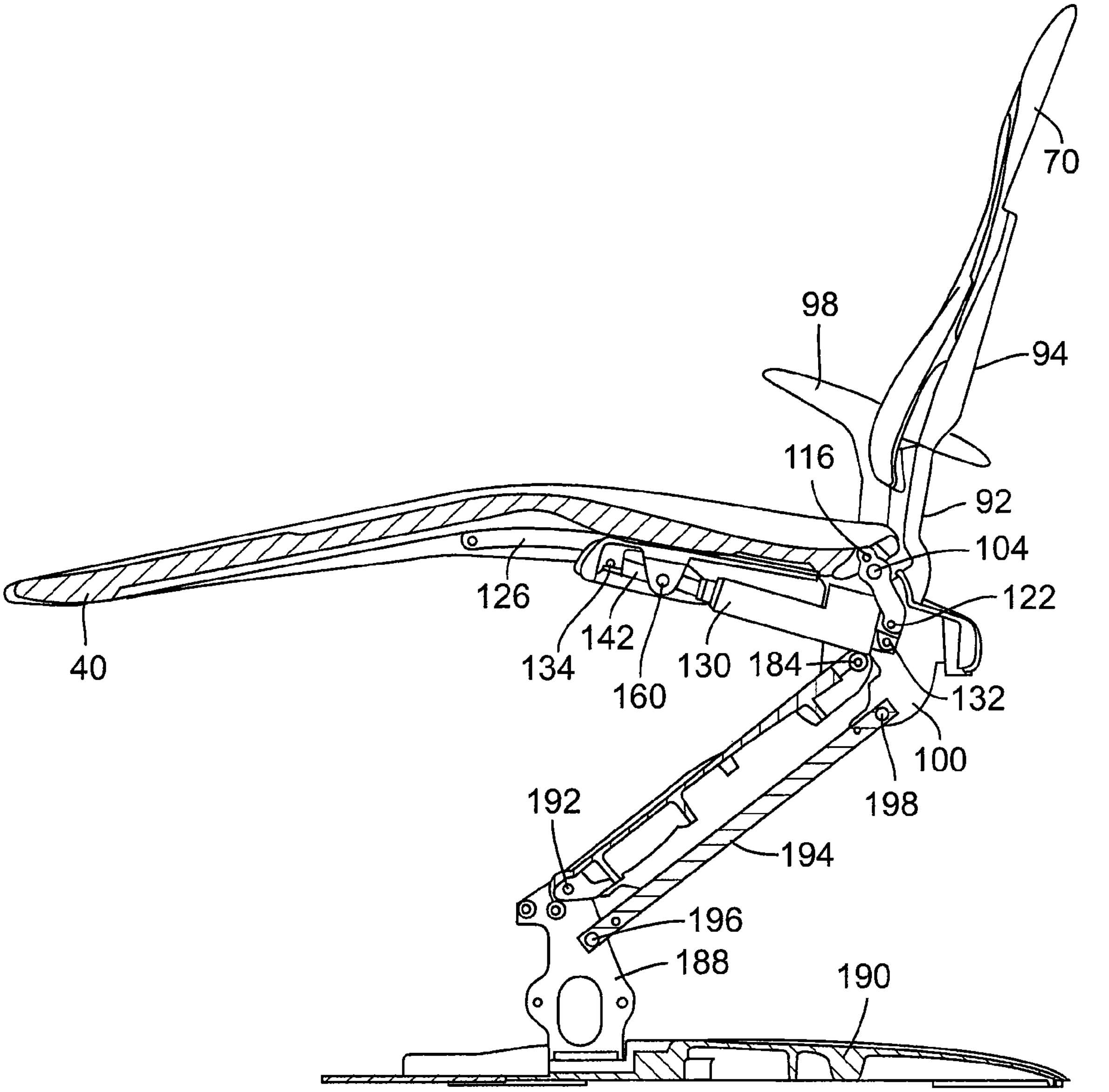
FIG. 18 is a left side, partial sectional view of a portion of a patient support apparatus, shown with an upper frame member in an upright configuration.

FIGS. 18 and 19 are sectional views of the chair 10, showing chair 10 with the upper body frame in an upright configuration (FIG. 18) and in a reclined configuration (FIG. 19). Referring to FIGS. 17 and 18, in the upright configuration, the actuator assembly 130 is in an extended configuration with rod 142 being substantially fully extended. As the actuator assembly 130 is moved from an extended configuration to a retracted (non-extended) configuration, the distance between the actuator assembly attachment point at the first end (i.e., pin 132) and the actuator attachment point at the second end (i.e., pin 134) is shortened, causing pivot member 92 to pivot about its pivot point at pin 104.

As shown in FIG. 19, as the actuator assembly 130 moves to an non-extended configuration, because the attachment point of the lower body frame 40 is offset from the pivot point of the pivot member, lower body frame 40 moves rearward as pivot member 92 pivots backwards into a reclined configuration. This rearward movement of lower body frame 40 helps maintain the proper position of the patient in the chair, generally mimicking the movement of the patient's hips as the patient's back reclines to the supine position.

At the same time, cams 126 also move forward, since they are attached to another offset portion of the pivot member 92 (i.e., at pin 122). When comparing FIGS. 18 and 19, it is apparent that the cams 126 move forward relative to lower body frame 40, causing lower body frame 40 to be raised higher as it moves along the rollers 174 located at the end of the cams 126.

Figure 20A:
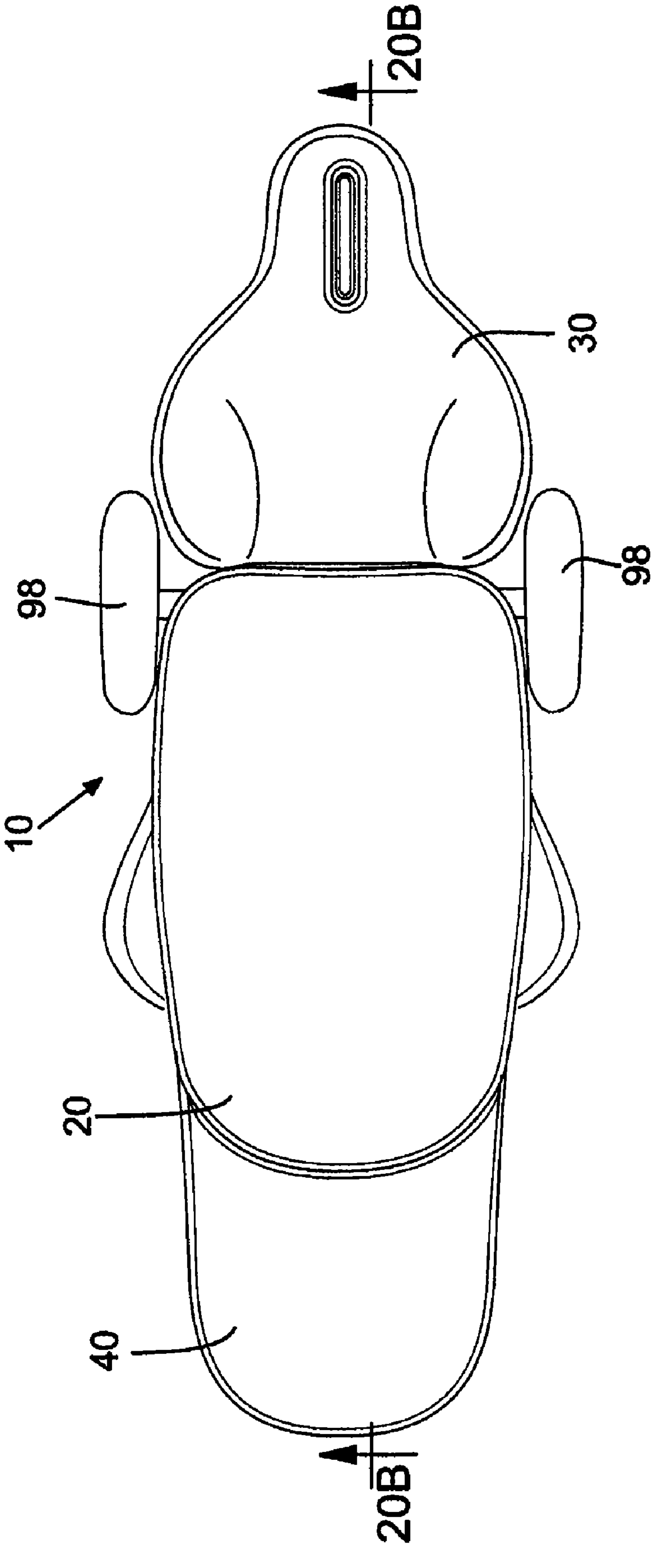
FIG. 20A is a top view of a patient support apparatus, shown with an upper frame member in a partially reclined configuration.
Figure 20B:
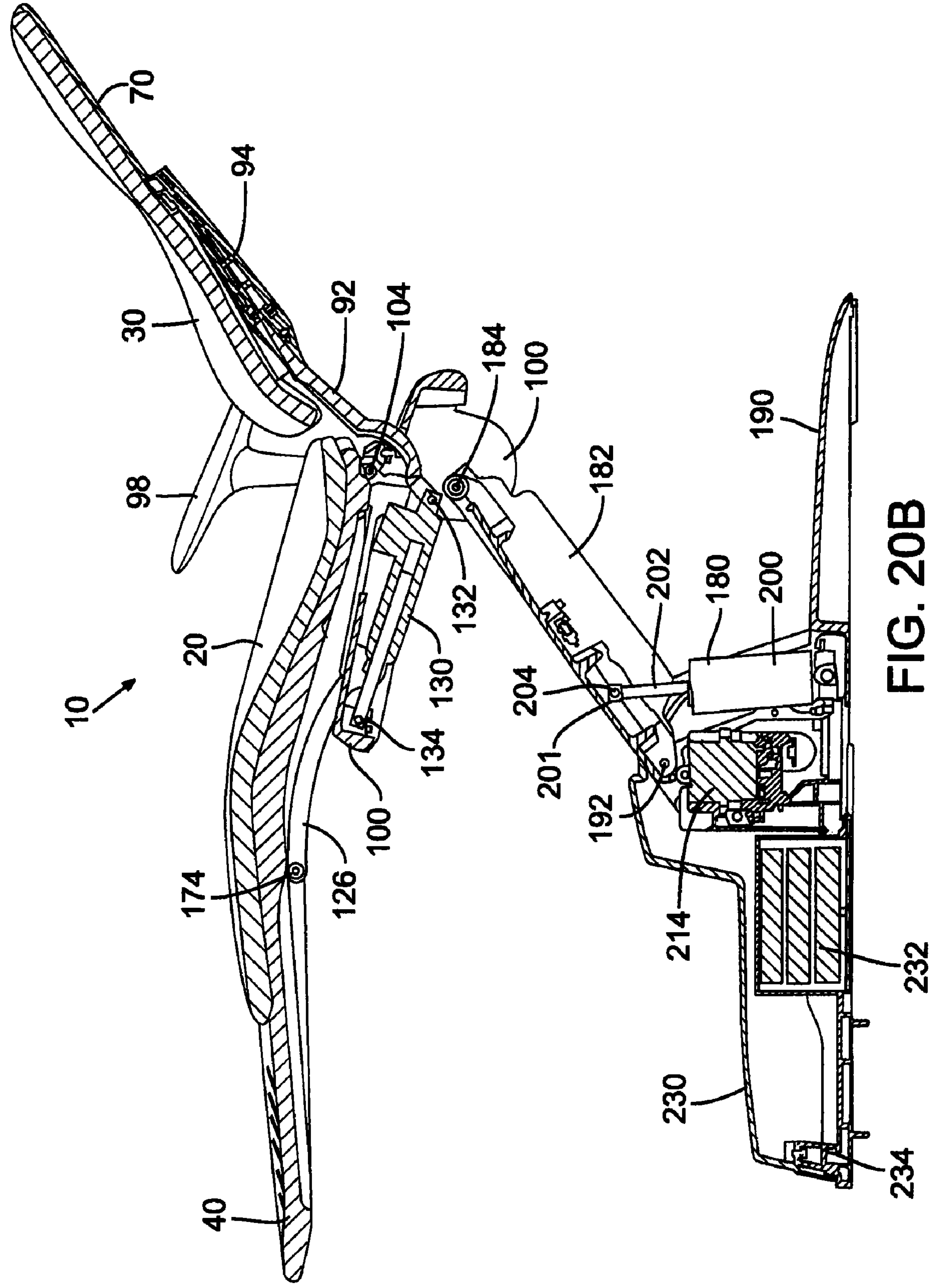
FIG. 20B is a cross-section view taken about line 20B-20B in FIG. 20A.

FIGS. 20A and 20B illustrate the chair 10 in an intermediate configuration between a substantially upright configuration (FIG. 18) and a substantially reclined configuration (FIG. 19). It should be understood that the apparatuses disclosed herein can be configured to move and be positioned at various configurations between the substantially upright configuration (FIG. 18) and the substantially reclined configuration (FIG. 19), as well as in positions that extend beyond the substantially upright configuration and the substantially reclined configuration specifically illustrated herein. As shown in the cross-sectional view of FIG. 20B, lower body frame 40 contacts and rolls on rollers 174 at the end of the cams 126 as the chair moves from one configuration to another.

As shown in FIG. 20B, the raising and lowering of the height of the chair structure (e.g., upper structure 100, lower body frames 40, and upper body frame 70) can be achieved by providing a cylinder assembly 180 that applies an upward force to a portion of a lift arm 182. The lift arm 182 is pivotably coupled to the upper structure 100 by shoulder bolts 184 that are secured to the upper structure 100 at openings 186 in the left and right sides of the upper structure 100 (FIG. 17). At the other end, the lift arm 182 can be coupled to a base member, such as the two tower members 188. Tower members 188 extend upwards from a baseplate 190 and one tower member 188 attaches to the lift arm 182 on each side of the lift arm 182. The lift arm 182 is preferably pivotably attached to the tower members 188, so that as cylinder assembly 180 pushes upwards against the lift arm (FIG. 20B), the lift arm 182 can pivot about attachment point 192. The lift arm 182 can be lowered by removing or reducing the upward force applied by the cylinder assembly 180 on the lift arm 182 and permitting gravity to move lift arm 182 (and, thus, the chair) to a lower height.

A link arm 194 can also be provided to stabilize the chair structure and to keep the chair structure substantially level as the chair goes through its vertical range of motion (e.g., as the chair is raised and lowered). As shown in FIG. 19, for example, link arm 194 can be provided on at least one side of the lift arm 182 (such as the right side) and can be pivotably attached to one tower member 188 at attachment point 196 and to the upper structure 100 at the other end at attachment point 198.

Figure 21:
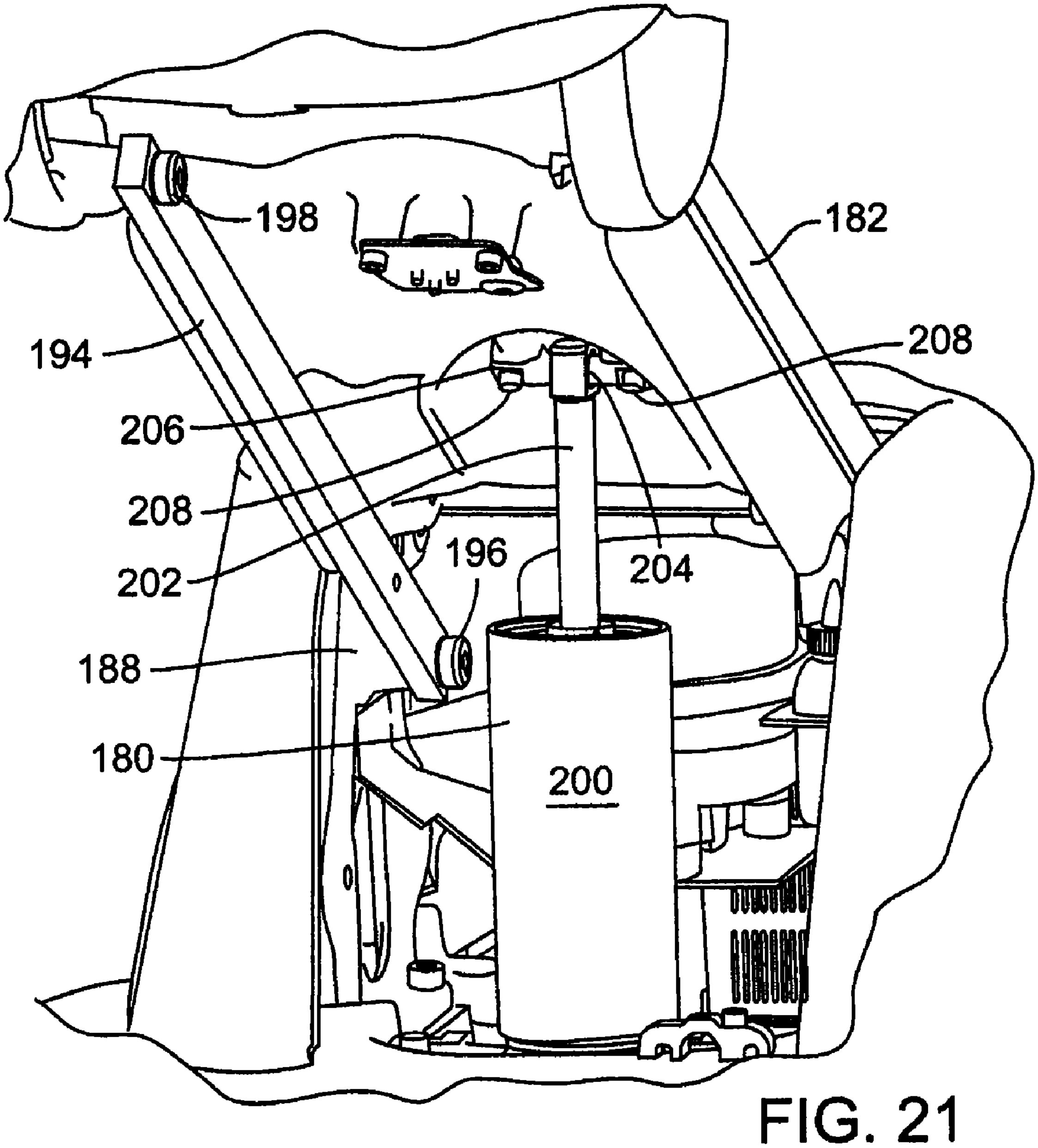
FIG. 21 is a partial view of a portion of a patient support apparatus showing a cylinder assembly.
Figure 22:
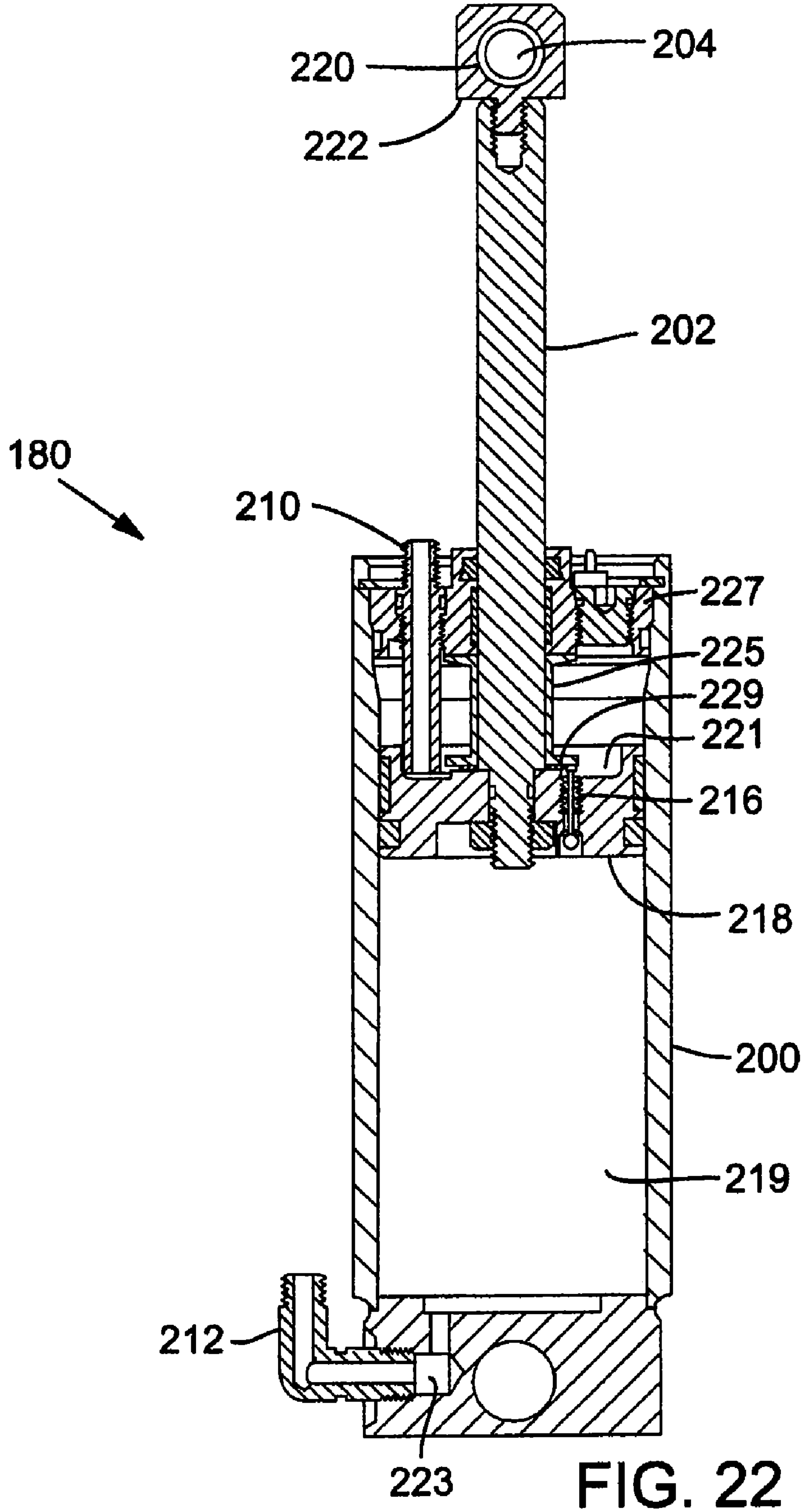
FIG. 22 is a cross-section view of a portion of the cylinder assembly shown in FIG. 21.

Referring to FIG. 21, a partial view of the chair is shown. Cylinder assembly 180 includes a base portion 200 and an extendable portion 202 (e.g., a piston or rod). The base portion 200 can be secured or attached to the baseplate 190 and the extendable portion can be provided with an opening 204 at one end. The opening 204 can receive a pin 206 that is secured to a lower portion of the lift arm 182 using screws 208. As the cylinder assembly 180 is activated, the extendable portion 202 moves upwards (or downwards) causing the lift arm 182 to raise (or lower). Opening 204 is sized to receive the pin 206 and permit the pin 206 to rotate relative to the opening 204 as the lift arm 182 moves from one height to another. If desirable, a sleeve bearing 220 (as shown in FIG. 22) can be provided in opening 204 to facilitate relative movement of the extendable portion 202 and the pin 206. The extendable portion 202 can also be configured to have a pivotable portion 222 (as shown in FIG. 22), the pivotable portion 222 defining the opening 204.

Referring again to FIG. 20B, the cylinder assembly 180 can be positioned vertically or substantially vertically. The substantially vertical orientation of the cylinder assembly 180 reduces the "footprint" of the chair relative to the ground. Thus, the chair can be more compact and can have a more open architecture underneath the chair structure. In addition, as noted above, the lift arm 182 is preferably coupled to a base member (e.g., two tower members 188). The height of this pivot point is preferably at least about 9 inches, more preferably about 10 or more inches. By having a higher pivot point, the chair can be raised upwards without significantly moving the chair forward or backward. This can help reduce the available operating clearance around the chair. In contrast, many conventional lift mechanisms require complicated mechanical systems that substantially fill the space beneath the chair and/or cause the chair to move significantly forward (in the direction of a patient's feet) while the chair is moving upwards.

As the extendable portion 202 moves upwards, it drives the lift arm 182 upwards. Because lift arm 182 is at an angle relative to the extendable portion 202, a small distance of travel of the extendable portion 202 causes a larger height change in the chair 10. Thus, for example, the extendable portion 202 can be configured to travel a distance of between about 3 and 5 inches, which can be configured to cause a corresponding height change of about 10-30 inches depending on the relative angle of contact with the lift arm 182. To decrease the footprint of the system and to maximize travel-to-height changes, the cylinder assembly is preferably configured to contact the lift arm 182 at a portion closer to one end than the other. In particular, the cylinder assembly 180 preferably is positioned closer to the area where the lift arm 182 is coupled to the tower members 188 than to the area of the lift arm 182 that is coupled to the upper structure 100. The cylinder assembly 180 is preferably configured as a single acting cylinder that is capable of operating at pressures between about 50 psi and 1500 psi, and more preferably between about 75 psi and 500 psi.

FIG. 22 illustrates a detailed view of an embodiment of the cylinder assembly 180. As discussed above, cylinder assembly 180 comprises a base portion 200 and an extendable member 202. Extendable member 202 can comprise a piston lift cylinder 218 that is moveable within the cylinder assembly 180. FIG. 22 shows the cylinder assembly 180 in a fully extended configuration. To eliminate unnecessary tubing and reduce the footprint of the cylinder assembly 180, cylinder assembly 180 is preferably configured without an external reservoir. That is, the cylinder assembly is configured to hold substantially all of the operable fluid of the cylinder assembly in the upper and lower reservoirs of the base portion. Of course, even though there is preferably no external reservoir, some amount of fluid may be contained outside of the upper and lower reservoir. For example, some fluid can be retained in the pump, hydraulic fittings, tubing, etc.; however, because there is no external reservoir, the total, operable fluid volume contained in the upper and lower reservoirs remains substantially the same regardless of the position of the extendable member.

Drop tube 210 and hydraulic fitting 212 are both connected to motor/pump 214. To raise the extendable portion 202, hydraulic fluid flows from an upper reservoir 221 to drop tube 210, to the motor/pump 214, through hydraulic fitting 212, and into a lower reservoir 219. To lower the extendable portion 202, the flow is reversed. Fluid is released by a solenoid valve 223, which permits fluid to flow from the lower reservoir 219, through hydraulic fitting 212, to the motor/pump 214, through drop tube 210, and into upper reservoir 221. Although solenoid valve 223 is shown schematically positioned within base portion 200, it should be understood that the solenoid valve and other flow control valves (such as a load hold check valve provided to maintain the position of the extendable member) can be provided external to the base portion 200. For example, an external manifold (not shown) can comprise various valves that are positioned between the pump and the cylinder assembly 180 to regulate flow from the pump to and from the upper and lower reservoirs.

In conventional hydraulic systems, travel limits are typically set in an electrical control system to prevent the extendable portion 202 from traveling too high and causing the extendable portion 202 to lock in an extended configuration. That is, if the extendable portion travels too far, the hydraulic system can "freeze up," i.e., become locked out at the fully extended configuration. Should the system "freeze up" or lock out at the extended configuration, it can be necessary to undo one or more hoses to relieve the pressure in the system. Electronic control systems, however, can fail, resulting in the system freezing up. Accordingly, it is desirable to provide a hydraulic system that is capable of self-regulating the amount of travel permitted by the extendable portion, even if electrical travel control limits are not provided.

Accordingly, the cylinder assembly preferably comprises a valve that is configured to allow fluid to flow between the upper and lower reservoirs when certain predetermined conditions are met. That is, the conditions under which the valve will open are predetermined and not determined by the end user, as is the case with the various valves that may be associated with the user-controlled flow of fluid between the upper and lower reservoir during operation of the chair. In the illustrated embodiments, valves are shown that can be configured to open under certain predetermined conditions including, for example, valves that are configured to open and permit flow between the two reservoirs when the extendable portion reaches a certain predetermined position (or height) or when pressure in one of the reservoirs reaches a certain predetermined amount.

As shown in FIG. 22, to prevent lock-out of the extendable portion 202, a bypass valve 216 can be configured to move with the extendable portion 202 within the main portion 200 and configured to be actuated when the piston lift cylinder 218 reaches a certain pre-determined height. The bypass valve 216 is configured so that when the extendable portion 202 reaches a certain height, the bypass valve 216 is actuated, and fluid can flow from one side of the piston lift cylinder 218 to the other. Thus, once activated, the bypass valve 216 allows fluid to flow from lower reservoir 219 to upper reservoir 221 (and vice versa) in the main portion 200. The passing of fluid in this manner effectively prevents the cylinder assembly 180 from reaching a configuration where the extendable portion 202 travels too far and causes the system to lock up. When the bypass valve is activated, fluid is simply recycled in the system and the extendable portion will not extend any further.

The mechanism that opens bypass valve 216 can vary. In the illustrated embodiment, a cylindrical spacer 225 surrounds a rod member of the extendable portion 202 and moves up and down with the piston lift cylinder 218. As the extendable portion 202 reaches the predetermined height, spacer 225 contacts the front head of the cylinder 227, which prevents spacer 225 from moving any further upwards, and a lower portion of the spacer 225 contacts and actuates the bypass valve 216 (as shown in FIG. 22). If desired, a spring washer 229 can be positioned between spacer 225 and piston lift cylinder 218 to prevent bypass valve 216 from opening prematurely.

Figure 28A:
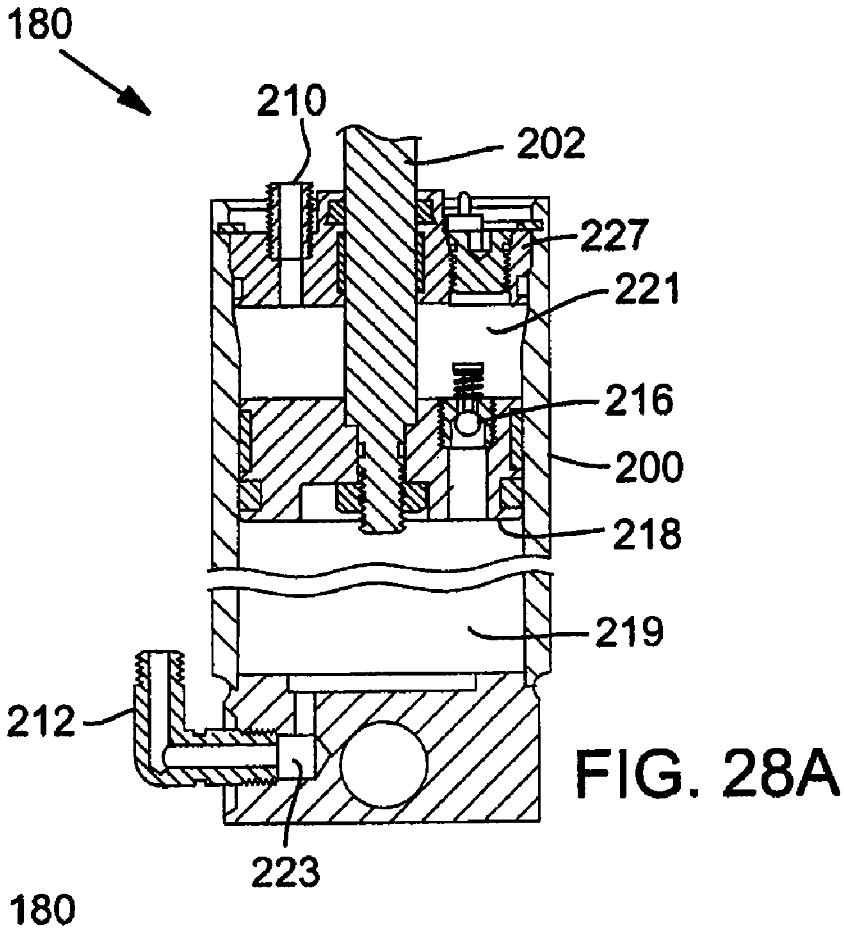
FIG. 28A is a cross-section view of a portion of a cylinder assembly, shown with a bypass valve in a closed position.
Figure 28B:
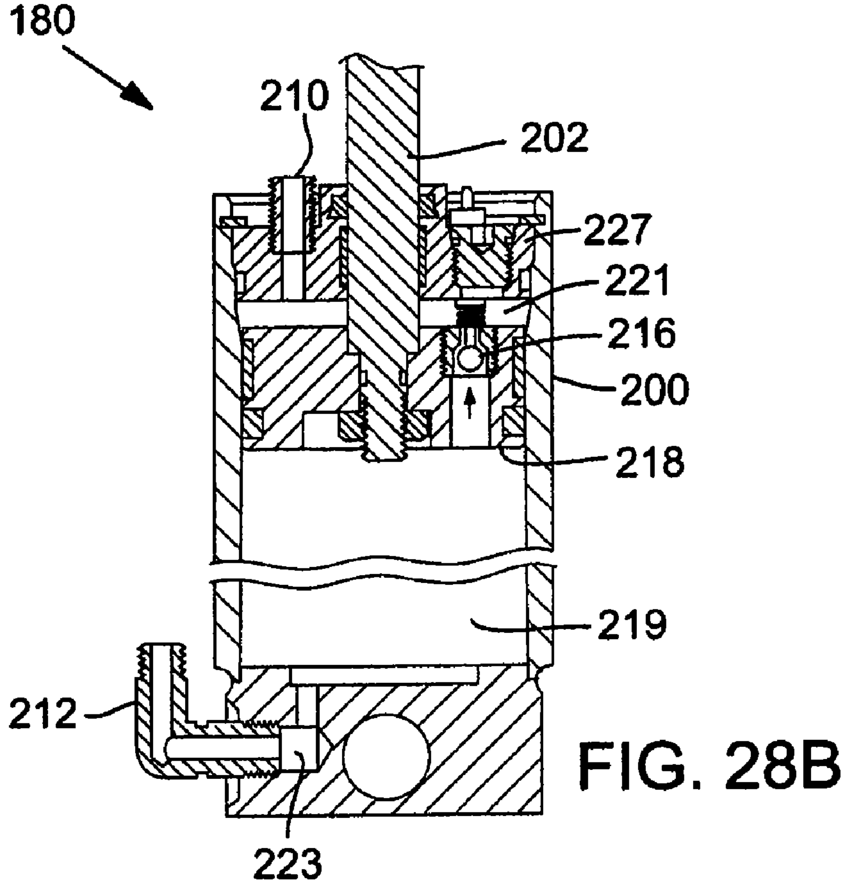
FIG. 28B is a cross-section view of a portion of a cylinder assembly, shown with a bypass valve in an open position.
Figure 29A:
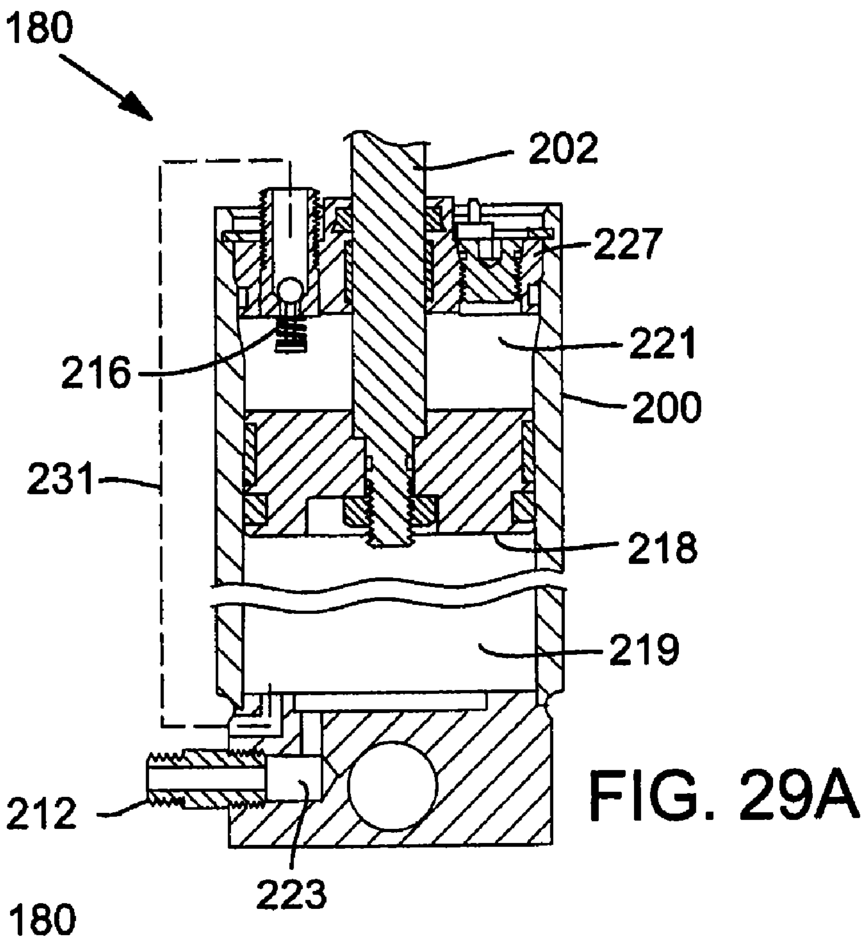
FIG. 29A is a cross-section view of a portion of a cylinder assembly, shown with a bypass valve in a closed position.
Figure 29B:
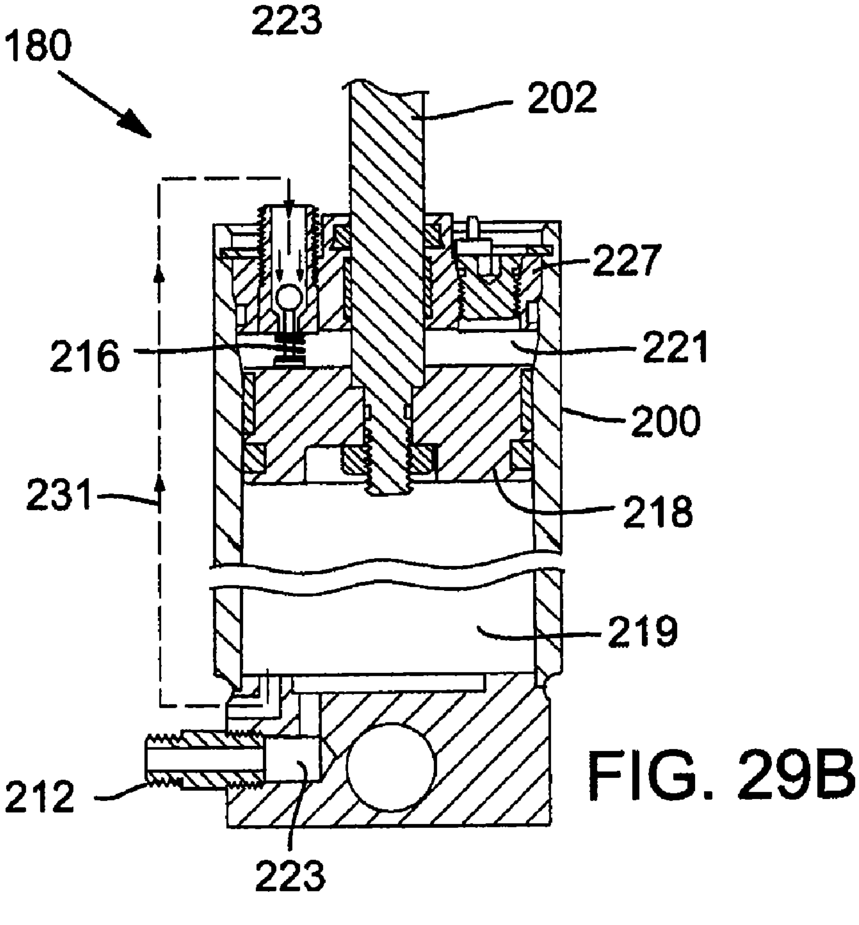
FIG. 29B is a cross-section view of a portion of a cylinder assembly, shown with a bypass valve in an open position.

Bypass valve 216 can be positioned within base portion 200 in a variety of configurations. For example, as shown in FIG. 22, the bypass valve can be moveable with the extendable portion and configured to contact a stationary member in the base portion when the extendable portion reaches the pre-determined extension limit. Alternatively, the bypass valve can be stationary within the base portion and a portion of the extendable portion can be configured to contact the bypass valve when the extendable portion reaches the predetermined extension limit. FIGS. 28A and 28B show schematic illustrations of a bypass valve configured to move with the extendable portion (as is shown in FIG. 22) and FIGS. 29A and 29B show schematic illustrations of a bypass valve that is configured to be stationary within the base portion. Generally, however, it is preferable to have the bypass valve move with the extendable portion, since that configuration can eliminate the need for external tubing.

Referring to FIGS. 28A and 28B, an extendable portion 202 that comprises a piston lift cylinder 218 is shown in a first, non-extended position (FIG. 28A) and a second, extended position (FIG. 28B). A main portion 200 of the cylinder assembly 180 comprises a lower reservoir 219 and an upper reservoir 221, and a bypass valve 216 is configured so that fluid can flow between the two reservoirs when the extendable portion 202 reaches a predetermined height. As shown in FIG. 28B, when the extendable portion 202 reaches the predetermined height, bypass valve 216 opens and permits fluid to flow from the lower reservoir 219 to the upper reservoir 221.

Referring to FIGS. 29A and 29B, another extendable portion 202 that comprises a piston lift cylinder 218 is shown in a first, non-extended position (FIG. 29A) and a second, extended position (FIG. 20B). For convenience, drop tube 210 is not shown in FIGS. 29A, 29B, 31A, and 31B; however, it should be understood that in order to circulate fluid in the manner discussed above with regard to FIG. 22, a drop tube or other fitting will be required.

In the illustrated embodiment shown in FIGS. 29A and 29B, a main portion 200 of the cylinder assembly 180 comprises a lower reservoir 219 and an upper reservoir 221, and a bypass valve 216 is configured so that fluid can flow between the two reservoirs when the extendable portion 202 reaches a predetermined height. Unlike FIG. 28B, however, FIG. 29B illustrates a bypass valve 216 that is stationary relative to the extendable portion 202. Because bypass valve 216 is positioned above extendable portion 202, additional tubing (shown schematically by dashed line 231) may be required to allow fluid to flow between lower reservoir 219 to upper reservoir 221. As shown in FIG. 29B, when the bypass valve 216 opens, fluid flows between the lower reservoir 219 to the upper reservoir 221 through tubing 231. Accordingly, if fluid is pumped into fitting 212 (as discussed above with regard to FIG. 22) while the bypass valve 216 is actuated (or open), fluid will simply be circulated through the upper and lower reservoirs as shown in FIG. 29B.

Suitable valves are those that are capable of handling the pressures inherent in the hydraulic system described herein and which can, upon the application of mechanical pressure at one end, permit fluid to flow between two ends of the valve. Various conventional valves can be used, including, for example, certain valves that are available through Schrader-Bridgeport International, Inc. Preferably, the valve will be rated to handle the pressures discussed above (e.g., at least up to about 500 psi and preferably up to 1500 psi or greater).

Figure 30A:
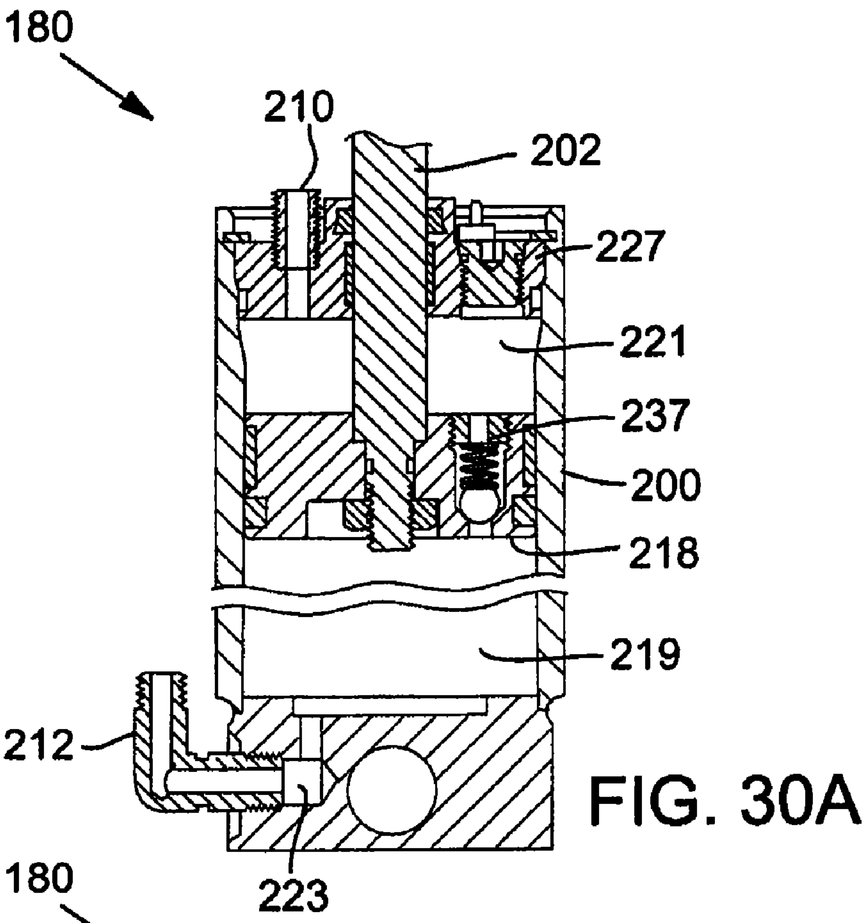
FIG. 30A is a cross-section view of a portion of a cylinder assembly, shown with a relief valve in a closed position.
Figure 30B:
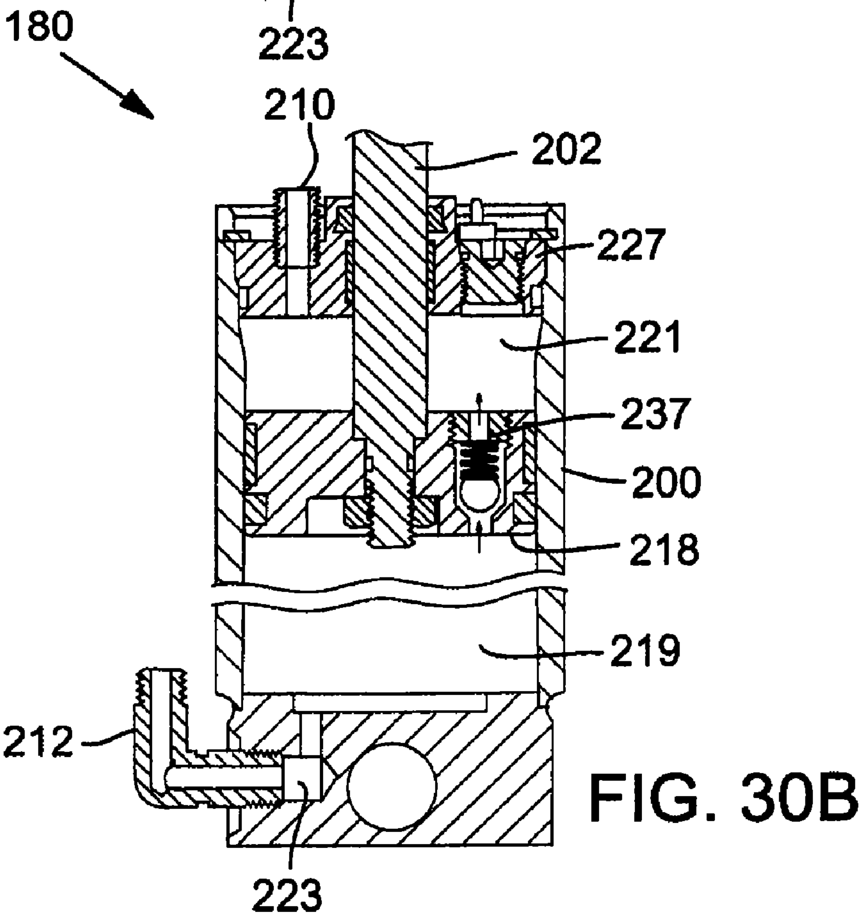
FIG. 30B is a cross-section view of a portion of a cylinder assembly, shown with a relief valve in an open position.

In another embodiment, the valve can comprise a relief valve that can be used instead of, or in combination with, a bypass valve. The relief valve can be used to prevent extendable portion 202 from reaching a position or height where lock-out of the extendable portion 202 can occur. For example, as shown schematically in FIGS. 30A and 30B, a relief valve 237 can be configured to move with extendable portion 202. Thus, at any cylinder stroke or position, if pressure in the lower reservoir 219 reaches a predetermined level, relief valve 237 will open and allow fluid to flow from the lower reservoir 219 to the upper reservoir 221 (as shown in FIG. 30B).

Figure 31A:
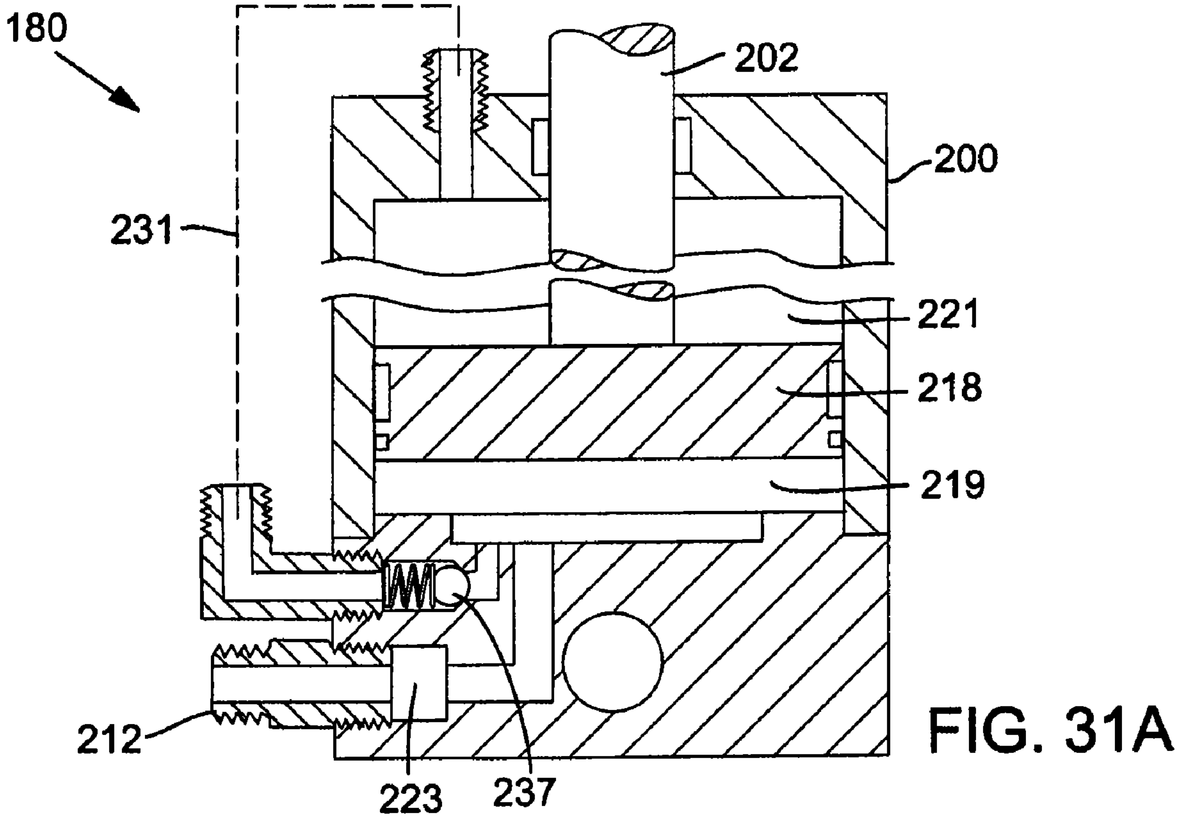
FIG. 31A is a cross-section view of a portion of a cylinder assembly, shown with a relief valve in a closed position.
Figure 31B:
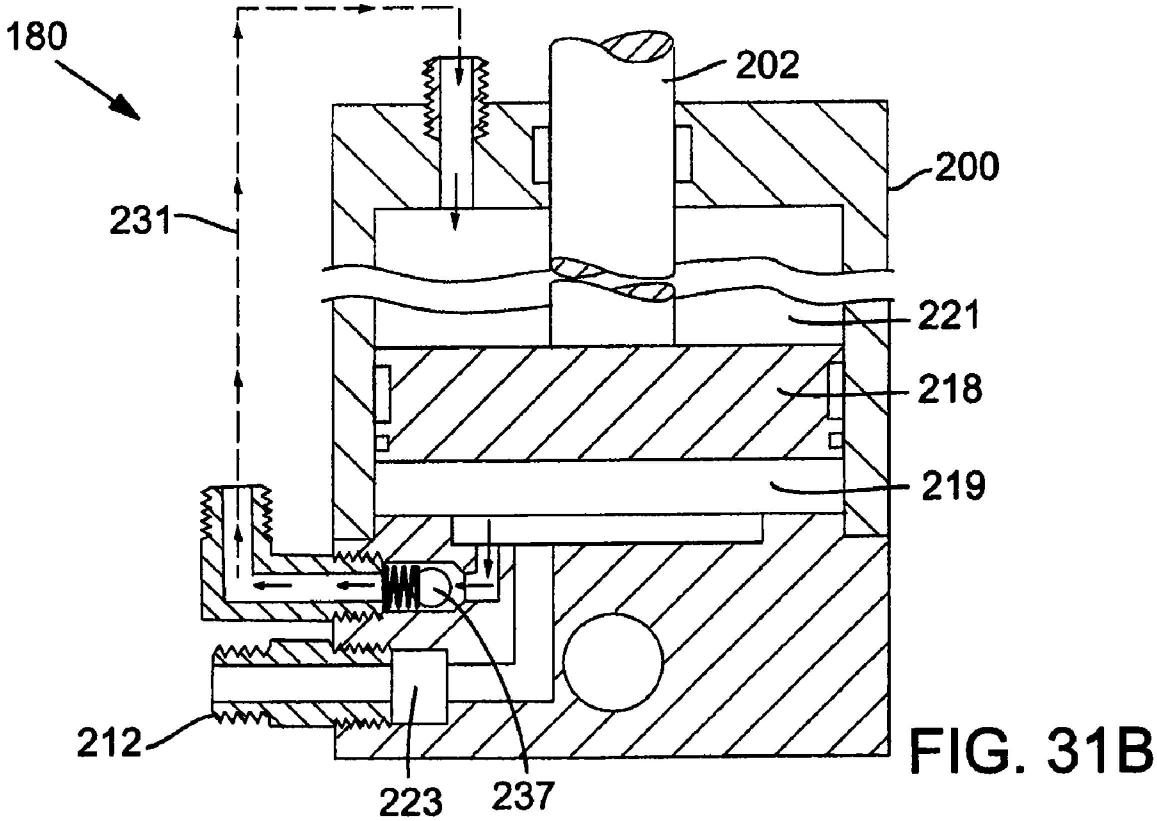
FIG. 31B is a cross-section view of a portion of a cylinder assembly, shown with a relief valve in an open position.

Referring to FIGS. 31A and 31B, relief valve 237 is shown positioned so that it is stationary relative to the extendable portion 202 (similar to the embodiments shown in FIGS. 29A and 29B with the bypass valve). Relief valve 237 can be configured so that it will open when pressure in the lower reservoir reaches a predetermined level. As described above with respect to FIGS. 29A and 29B, additional tubing 231 can be positioned between the lower reservoir 219 and the upper reservoir 221 to permit fluid to flow between the two reservoirs when the relief valve is open. The predetermined pressure limits of the relief valves shown in the illustrated embodiments can vary depending on the particular application. However, in some embodiments, the relief valve will preferably open when the pressure in the lower reservoir exceeds about 750 PSI.

Referring again to FIG. 20B, cover 230 can be configured to cover a portion of the lower portion of the chair 10, including the motor/pump 214 and a power supply 232. Desirably, cover 230 has an upper portion 233 and a lower portion 235, with the upper portion 233 having a smaller width than the lower portion 235. The cover 230 can be releaseably coupled to a bump ring member 234 that can at least partially surround the power supply 232.

Figure 23:
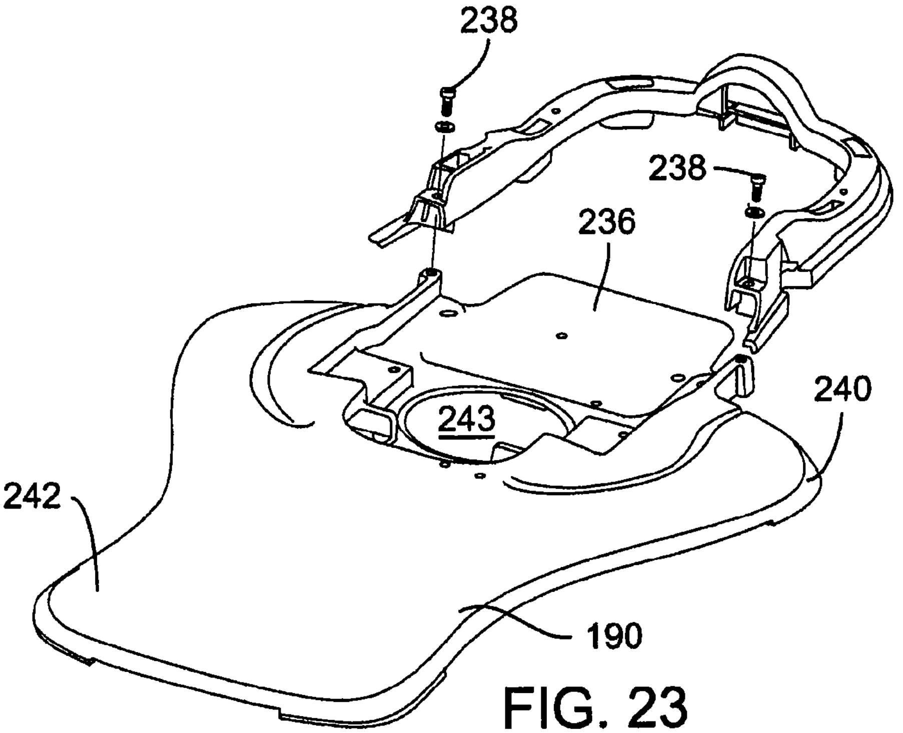
FIG. 23 is an exploded perspective view of a base plate and a bump ring of a patient support apparatus.
Figure 24:
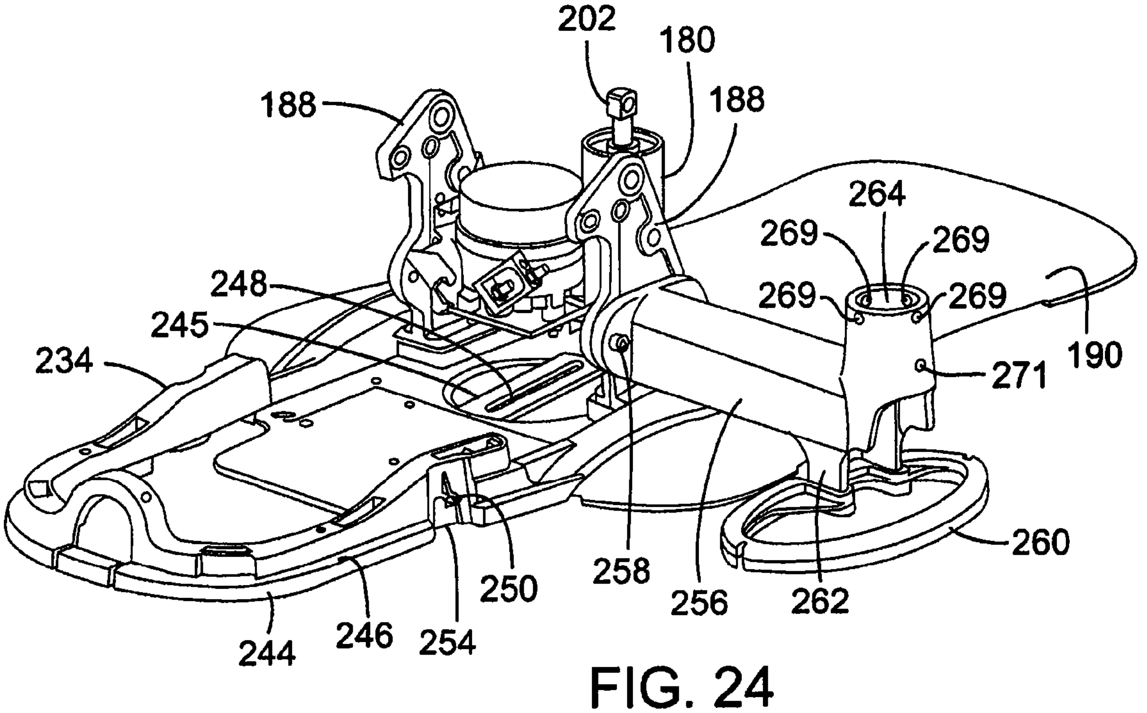
FIG. 24 is a perspective view of a portion of a base of a patient support apparatus coupled to a post mount assembly.

Referring to FIG. 23, the lower portion of the chair is described in more detail. Baseplate 190 preferably extends rearward beneath the lower portion of the chair 10 (as shown in FIG. 20B). Baseplate 190 preferably has a low profile that allows the lift arm 182 (described above) to extend into the headspace above the baseplate 190. Also, the low profile of the baseplate 190 permits easy access to the underside of the chair, while at the same time preventing an operator's body and/or supporting chair (e.g., a wheeled stool) from entering into the headspace above the baseplate 190, which could cause injury to the operator. Baseplate 190 can have a wider area 240 and a narrower area 242 further rearward and a contoured shape therebetween. The narrower area 242 permits an operator (e.g., a dentist) to position a supporting chair (not shown) closer to the patient. Baseplate 190 can also comprise an opening that defines a mounting area 243 for mounting a portion of the chair 10 to the floor. As shown in FIG. 24, the mounting mechanism can comprise, for example, a cleat 245 that can be secured to the floor. Preferably cleat 245 comprises a slotted portion 248 to permit the location of the chair to be adjustable after securing a bolt or other securing member to the floor. For example, a bolt (not shown) can be passed through the slotted portion 248 of the cleat 245 and by at least partially loosening the bolt, the location of the chair 10 can be adjusted without needing to re-drill another bolt location.

Bump ring member 234 preferably extends forward from baseplate 190, surrounding at least a portion of the power source receiving area 236 (e.g., power supply 232 and/or motor/pump 214). Bump ring member 234 can be formed separate from baseplate 190 (as shown in FIG. 23) or it can be integrally formed with the baseplate 190. As shown in FIG. 23, if bump ring member 234 is a separately formed structure it can be coupled to baseplate 190 using, for example, screw members 238.

Bump ring member 234 preferably comprises a radially extending portion 244 that has a ledge portion 246 on its upper surface. Ledge portion 246 can be configured to receive and support a lower portion of cover 230. As shown in FIG. 24, bump ring member 234 can also include one or more projections 250 that extend from a portion of the bump ring member 234. Referring to FIG. 1, cover 230 can be formed with one or more openings 252 that are configured to receive projections 250 when the cover 230 is positioned on ledge portion 246 of bump ring member 234. In operation, cover 230 can be positioned on ledge portion 246 and secured there by the extension of one or more projections 250 into the corresponding openings 252. Preferably, bump ring member 234 is formed with an indentation or concave portion 254 below the location of the projections 250. Accordingly, the cover 230 can be released from bump ring member 234 without tools by positioning a finger into the concave portion 254 and pulling the cover 230 outward to release the projection 250 from the opening 252. Thus, the bump ring member can positively engage the cover and be manually releasable.

As bump ring member 234 is positioned adjacent to the floor, it will be a more likely contact point for operator chair wheels, floor cleaning equipment (and related chemical treatments), and the like. Accordingly, bump ring member 234 is desirably stiffer and less flexible than the cover 230. For example, bump ring member 234 can be formed of PBT (polybutylene terephthalate) and cover 230 can be formed of acrylic polyvinyl chloride, which has a relatively high strength, rigidity, and toughness and chemical resistance to a wide range of chemicals, solvents, oils and greases. Of course, other materials can be used for both bump ring member and cover; however, since the bump ring is subjected to greater forces, the material forming bump ring member is preferably stiffer and less flexible material than the material forming the cover.

The cover 230 is preferably also scuff resistant. The shape of the cover 230 can be smooth and contoured, providing an attractive aesthetic element as well as removing any sharp edges that can catch on patient clothing or impact against an area of the body of the patient. The cover can serve to protect the internal structure of the chair from dust, dirt, and other possible contaminants that could cause damage or harm to the internal structure. The tool-less attachment method described above also preferably achieves a close fit between the cover 230 and bump ring member 234, thereby further reducing potential openings into which contaminants can enter.

Referring again to FIG. 24, a post mount 256 can be configured to extend from one or more of the tower members 188. Post mount 256 can be secured to tower member 188 using, for example, one or more screws 258. Post mount 256 can extend out of an opening in the cover 230, such as cut-out 253 shown in FIG. 1. If desired, post mount 256 can be provided with a base portion 260 that receives a portion of post mount 256 and provides a stable base for the elements that are to be mounted, coupled, or associated with post mount 256. As shown in FIG. 24, base portion 260 can receive extension members 262 into recesses in an upper portion of base portion 260 to couple or associate post mount 256 with base portion 260. Post mount 256 can comprise a tapered socket 264 for receiving a post 266 in a self-leveling (e.g., self-plumbing) manner. Because the post 266 is at least partially self-leveling, installation and adjustment of the post 266 (and related supporting elements) can be simplified and easily accomplished.

Figure 25:
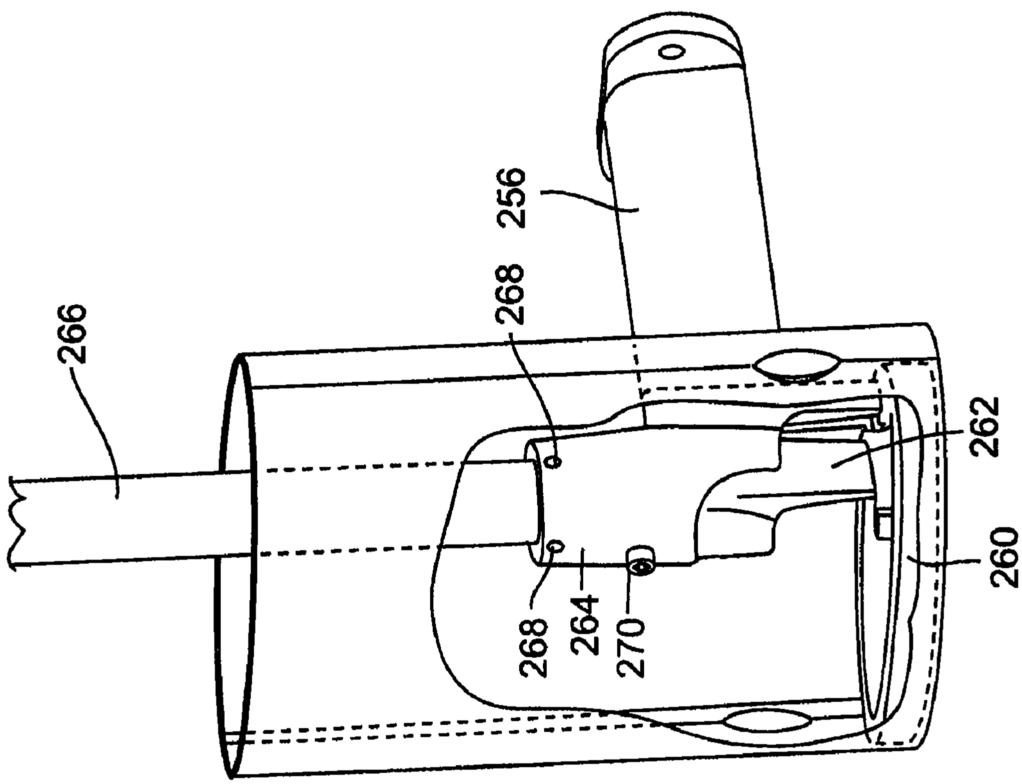
FIG. 25 is a view of a portion of a base of a patient support apparatus, including a post mount assembly.

Referring now to FIG. 25, a post 266 can be configured to be received in socket 264 of post mount 256. Post 266 is preferably at least partially hollow so that various connections, wires, tubing, etc. can pass through post 266. For example, as shown in FIG. 25, post 266 can have one or more openings running at least a portion of the longitudinal length of the post 266. Utility lines, such as plumbing and electrical lines, can be carried by or passed through the longitudinal openings of post 266. Post 266 can also be configured to support a variety of dental equipment (with or without utility lines), including dental lights, control panels, touch pads, water distribution systems (e.g., cuspidors), and other dental elements.

Figure 26:
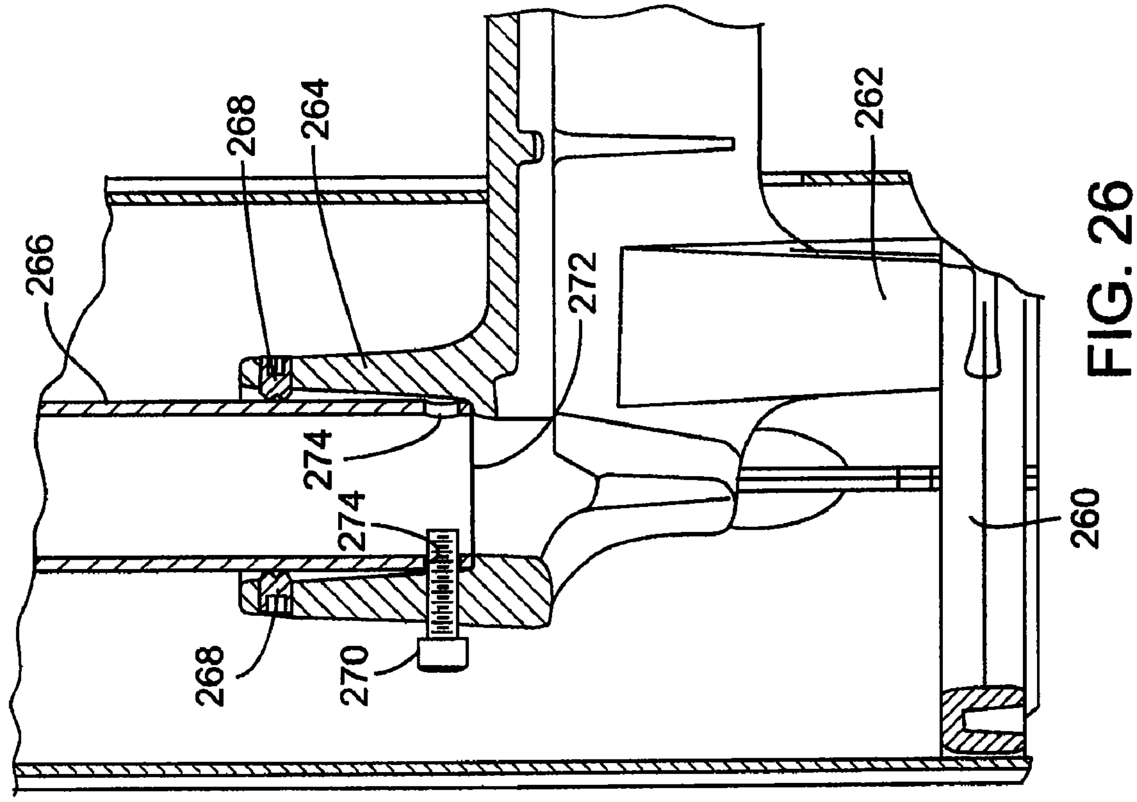
FIG. 26 is a cross-section view of a base of a patient support apparatus, including a post mount assembly.

Post 266 is preferably coupled to post mount 256 so that the post 266 is perpendicular to the floor. To achieve this perpendicularity, socket 264 can be tapered, as shown in FIG. 26. A lower portion of the tapered socket 264 can have a lip portion 272 that extends inward and which supports post 266. Also, the angle of post 266 relative to the floor can be changed by adjusting a plurality of set screws 268 which pass through openings 269 (shown in FIG. 24). The set screws 268 at least partially surround post 266 when it is received in tapered socket 264. The number of set screws can vary; however, it is preferable that there be at least three set screws so that post 266 is at least partially surrounded. In FIG. 25 there are four set screws 268 that are spaced 90 degrees apart from one another. By adjusting the distance that the set screws 268 extend into the socket 264, the vertical alignment of the post 266 can be adjusted.

An orienting member 270, such as a bolt, can extend into an opening 271 in the post mount 256 and can extend at least partially into the path of post 266. Post 266 can be configured with a slot that extends from the bottom end of the post 266 upward past the orienting member 270 when the post 266 is received in the tapered socket 264. In this manner, the post 266 can be configured to be received into the socket 264 in only one orientation, which can be desirable if wires or other elements are configured to be received and held within post 266.

In view of the many possible implementations to which the principles of the disclosed embodiments may be applied, it should be recognized that the illustrated embodiments are only preferred examples and should not be taken as limiting the scope of protection. Rather, the scope of the protection is defined by the following claims, and we claim all that comes within the scope and spirit of these claims.

We claim:

1. A dental chair and equipment support apparatus comprising:

a base member coupled to a lift arm of a dental chair;

a post mount coupled to the base member and extending outwards from the base;

a post member configured to be received in post mount;

a cover configured to at least partially cover the base member; and a bump member that at least partially surrounds the base member, the bump member being releasably engageable with the cover, wherein the post mount comprises a tapered socket with a plurality of openings at least partially surrounding the tapered socket and the post member is configured to be coupled to the post mount by inserting a plurality of fasteners into the openings in the tapered socket.

2. The apparatus of claim 1, wherein the fasteners can be adjusted to adjust the angle of the post member relative to the floor.

3. The apparatus of claim 1, wherein when the bump member is releasably engaged with the cover at an engagement area and the bump member comprises a recessed portion beneath the location of the engagement area, and the cover can be removed from the bump member by inserting a finger into the recessed portion and pulling the cover outward to disengage the bump ring from the cover.

4. A support apparatus comprising:

a tapered socket that defines a post receiving area;

a plurality of fasteners spaced circumferentially around the tapered socket and configured to extend into the post receiving area; and a post member configured to be received in the post receiving area;

wherein the plurality of fasteners are configured to couple the post member to the tapered socket, and wherein the post member comprises at least one longitudinal opening running along at least a portion of a length of the post, the opening being configured to receive one or more utility lines.

5. The apparatus of claim 4, wherein the fasteners comprise a plurality of set screws that extend into openings in the tapered socket, the set screws being configured to adjust the angle of the post member relative to the floor.

6. The support apparatus of claim 4, further comprising an orienting member that extends into the post receiving area, wherein the post member has a slotted section at a lower end, the slotted section configured to mate with the orienting member.

7. The apparatus of claim 4, further comprising a post mount that extends from the tapered socket and is configured for attachment to a patient support apparatus.

* * * * *